(12) United States Patent
Liao et al.

(10) Patent No.: US 11,336,759 B2
(45) Date of Patent: May 17, 2022

(54) ROTATING SHAFT MECHANISM AND MOBILE TERMINAL

(71) Applicant: HUAWEI TECHNOLOGIES CO., LTD., Guangdong (CN)

(72) Inventors: Li Liao, Dongguan (CN); Kenji Nagai, Yokohama (JP); Ding Zhong, Dongguan (CN); Tao Huang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/394,750

(22) Filed: Aug. 5, 2021

(65) Prior Publication Data

US 2021/0368032 A1 Nov. 25, 2021

Related U.S. Application Data

(63) Continuation of application No. PCT/CN2019/130905, filed on Dec. 31, 2019.

(30) Foreign Application Priority Data

Mar. 15, 2019 (CN) .......................... 201910196567.3

(51) Int. Cl.
*H04M 1/02* (2006.01)
(52) U.S. Cl.
CPC .................................. *H04M 1/021* (2013.01)

(58) Field of Classification Search
CPC .... H04M 1/021; H04M 1/0268; H04M 1/022; H04M 1/0214; H04M 1/0216; G06F 1/1652; G06F 1/1681; G06F 1/1616
See application file for complete search history.

(56) References Cited

U.S. PATENT DOCUMENTS

| 9,173,287 | B1   | 10/2015 | Kim et al. |             |
|-----------|------|---------|------------|-------------|
| 9,507,387 | B2 * | 11/2016 | Tsao       | G06F 1/1681 |
| 9,535,452 | B2   | 1/2017  | Ahn        |             |
| 9,848,502 | B1 * | 12/2017 | Chu        | G06F 1/1681 |
| 2007/0293285 | A1 * | 12/2007 | Kang    | H04M 1/0214 |
|           |      |         |            | 455/575.1   |

(Continued)

FOREIGN PATENT DOCUMENTS

| CN | 202587090 U | 12/2012 |
| CN | 202926863 U | 5/2013  |

(Continued)

*Primary Examiner* — Lewis G West
(74) *Attorney, Agent, or Firm* — Womble Bond Dickinson (US) LLP

(57) ABSTRACT

In a rotating shaft mechanism and a foldable mobile terminal, connecting rods and swing arms are rotatably connected to a main shaft assembly, and the swing arms and the connecting rods rotate around different axes, so that the swing arms and the connecting rods rotate and slide relative to each other. During folding, the connecting rods or the swing arms drive the two support plates to rotate towards each other, the support plates and the main shaft assembly enclose folding space for accommodating a flexible display of the mobile terminal in a folded state, so that the bending effect of the flexible display is improved, and two housings of the mobile terminal fit almost seamlessly in the folded state.

25 Claims, 16 Drawing Sheets

(56) References Cited

U.S. PATENT DOCUMENTS

| | | | |
|---|---|---|---|
| 2015/0233162 A1* | 8/2015 | Lee | H04M 1/02 |
| | | | 16/223 |
| 2016/0187935 A1 | 6/2016 | Tazbaz et al. | |
| 2016/0302314 A1* | 10/2016 | Bae | G06F 1/1616 |
| 2016/0324023 A1 | 11/2016 | Kim et al. | |
| 2017/0061836 A1 | 3/2017 | Kim et al. | |
| 2020/0081487 A1 | 3/2020 | Lin | |
| 2020/0264674 A1* | 8/2020 | Km | G06F 1/1616 |
| 2021/0181808 A1* | 6/2021 | Liao | G06F 1/1652 |
| 2021/0240232 A1* | 8/2021 | Cheng | G06F 1/1616 |
| 2021/0271294 A1* | 9/2021 | Liao | H04M 1/0216 |
| 2021/0355988 A1* | 11/2021 | Cheng | G06F 1/1652 |
| 2021/0381289 A1* | 12/2021 | Hsu | G06F 1/1681 |

FOREIGN PATENT DOCUMENTS

| | | |
|---|---|---|
| CN | 105491193 A | 4/2016 |
| CN | 105812509 A | 7/2016 |
| CN | 206100088 U | 4/2017 |
| CN | 206559426 U | 10/2017 |
| CN | 206723246 U | 12/2017 |
| CN | 206993161 U | 2/2018 |
| CN | 108076171 A | 5/2018 |
| CN | 108965501 A | 12/2018 |
| JP | 2017188027 A | 10/2017 |
| KR | 20160129724 A | 11/2016 |
| WO | 2018210188 A1 | 11/2018 |

\* cited by examiner

ROTATING SHAFT MECHANISM AND MOBILE TERMINAL

CROSS-REFERENCE TO RELATED APPLICATIONS

This application is a continuation of International Application No. PCT/CN2019/130905, filed on Dec. 31, 2019, which claims priority to Chinese Patent Application No. 201910196567.3, filed on Mar. 15, 2019. The disclosures of the aforementioned applications are hereby incorporated by reference in their entireties.

TECHNICAL FIELD

This application relates to the field of mobile terminal technologies, and in particular, to a rotating shaft mechanism and a mobile terminal.

BACKGROUND

As a flexible foldable display technology becomes increasingly mature, a flexible foldable terminal product is bound to be a major trend in the future. A foldable terminal product (for example, an electronic device such as a foldable mobile phone, a foldable tablet, or a foldable computer) needs to meet relatively high reliability, relatively good operation experience, and a relatively good industrial design (ID) appearance, so that the foldable terminal product can be accepted by consumers. A foldable mobile phone is used as an example. Different from a previous flip mobile phone, because a display of a flexible foldable mobile phone is continuously foldable, to ensure that the foldable display is not pulled or squeezed, an appearance of a structural design of the product is greatly deformed at a bending part of a rotating shaft in a middle part. However, a common structure cannot achieve such a large deformation amount. Therefore, in a flexible foldable terminal product, a special hinge needs to be designed for a bent and deformed part, to meet requirements such as operation experience, an appearance, and reliability of a structural design of the product. However, thickness of a bent part of a folded hinge used in the prior art is greater than thickness of a structural design, affecting an effect of a folded terminal.

SUMMARY

This application provides a rotating shaft mechanism and a mobile terminal, to improve a folding effect of the mobile terminal.

According to a first aspect, a rotating shaft mechanism is provided. The rotating shaft mechanism is applied to a foldable mobile terminal and is used as a folding mechanism of the mobile terminal. The rotating shaft mechanism is fixedly connected to two housings of the mobile terminal, and when the mobile terminal is folded, the two housings rotate around the rotating shaft mechanism to implement folding. When the rotating shaft mechanism is specifically disposed, the rotating shaft mechanism includes a main shaft assembly, a swing arm assemblies, and a support assembly. The main shaft assembly is a support piece, and the swing arm assembly is configured to connect the support assembly and the main shaft assembly. A movement manner of the support assembly is changed by using the swing arm assembly, to improve a folding effect of the mobile terminal. The swing arm assembly includes at least one connecting rod group and at least one swing arm group. Each connecting rod group includes two connecting rods that are correspondingly disposed on two sides of the main shaft assembly and that are rotatably connected to the main shaft assembly. Each swing arm group includes swing arms that are respectively disposed on the two sides of the main shaft assembly, and the swing arms are configured to be fixedly connected to the two housings of the mobile terminal. In addition, each swing arm is rotatably connected to the main shaft assembly, and an axis around which each swing arm rotates and an axis around which a corresponding connecting rod rotates are different axes, and each are parallel to a length direction of the main shaft assembly. Each swing arm is slidably connected to and can rotate relative to at least one connecting rod located on a same side. When the swing arm assembly supports the support assembly, the support assembly includes support plates correspondingly disposed on the two sides of the main shaft assembly, and each support plate is rotatably connected to a swing arm located on a same side and is slidably connected to and can rotate relative to a connecting rod located on the same side, or each support plate is rotatably connected to the main shaft assembly, and is slidably connected to and can rotate relative to a swing arm located on a same side. An axis around which the support plate is rotatably connected to the swing arm or rotatably connected to the main shaft assembly is parallel to a length direction of the main shaft assembly. During use, when the swing arms located on the two sides of the main shaft assembly rotate to a first position in directions towards each other, the corresponding connecting rods or the swing arms drive the two support plates to rotate to a second position in directions towards each other, and the support plates and the main shaft assembly enclose folding space for accommodating a flexible display of the mobile terminal. In addition, the connecting rods rotate, and the swing arms rotate relative to the main shaft assembly, so that thickness of the folded folding mechanism is approximately equal to thickness of the two stacked housings, thereby improving an effect of the folded mobile terminal. In addition, the support plates and the main shaft assembly enclose the space for accommodating the flexible display, thereby improving a bending effect of the flexible display.

When the rotation axes of the swing arms and the connecting rods are specifically disposed, the axes around which the two connecting rods in each connecting rod group rotate are symmetrically disposed on two sides of the axes around which the two swing arms in the corresponding swing arm group rotate.

When the connecting rod slides relative to the swing arm, a sliding direction of the connecting rod is perpendicular to an axial direction of the connecting rod, and when the swing arms located on the two sides of the main shaft assembly rotate to the first position in the directions towards each other, the corresponding connecting rods slide to positions close to the axes around which the swing arms rotate. During relative rotation between the connecting rod and the swing arm, the connecting rod slides towards an end that is of the swing arm and that is slidably connected to the main shaft assembly.

When the swing arms are slidably assembled with the main shaft assembly, first arc-shaped sliding slots in a one-to-one correspondence with the swing arms are disposed on the main shaft assembly, and first arc-shaped arms slidably assembled in the corresponding first arc-shaped sliding slots are disposed on the swing arms.

When the main shaft assembly is specifically disposed, the main shaft assembly includes a main outer shaft and a main inner shaft fixedly connected to the main outer shaft.

Each first arc-shaped sliding slot includes a concave arc-shaped groove disposed on the main outer shaft and an arc-shaped surface that is disposed on the main inner shaft and that covers the arc-shaped groove. A structure of the first arc-shaped sliding slot is implemented through assembly.

In addition to the foregoing manner of disposing the first arc-shaped sliding slot, another manner may be alternatively used. For example, the main shaft assembly includes a main outer shaft and a main inner shaft fixedly connected to the main outer shaft. The first arc-shaped sliding slots are disposed on the main inner shaft or the main outer shaft, facilitating disposing of structures of the first arc-shaped sliding slots.

When the swing arms are specifically disposed, the first arc-shaped arms correspondingly disposed on the two swing arms in each swing arm group are disposed in a staggered manner, thereby increasing lengths of slidable connection parts between the swing arms and the main shaft assembly, and further improving structural stability.

When the connecting rods are specifically disposed, gears are respectively disposed on two opposite ends of the two connecting rods in each connecting rod group, and the two gears engage with each other. The two engaging gears are disposed, so that the connecting rods can move synchronously, thereby ensuring synchronization between the two housings when the mobile terminal is folded.

When the gears cooperate with the main shaft assembly, a cavity for accommodating the two engaging gears is disposed in the main shaft assembly. The two gears are located in the cavity, and the two gears are rotatably connected to the main shaft assembly. Rotatable connection between the connecting rods and the main shaft assembly is implemented through rotatable connection between the two gears and the main shaft assembly.

In addition, to ensure a state of the unfolded or folded mobile terminal, the main shaft assembly further includes a limiting mechanism, configured to limit relative positions at which the connecting rods rotate relative to the main shaft assembly. Rotation of the connecting rods relative to the main shaft assembly is limited by using the limiting mechanism, to limit a folded and unfolded state of the mobile terminal.

The limiting mechanism may use different structures. In an embodiment, the limiting mechanism includes a first cam that rotates synchronously with each connecting rod, and a second cam that is disposed opposite to each first cam. Protrusions and notches that engage with each other are disposed on opposite surfaces of the first cam and the second cam that are disposed opposite to each other, and one of the first cam and the second cam can slide relative to the main shaft assembly. The limiting mechanism further includes an elastic part configured to push the first cam or the second cam to slide towards the other corresponding cam. Rotation positions of the connecting rods and the main shaft assembly can be limited through cooperation between the protrusions and the notches on the first cam and the second cam.

When the first cam is specifically disposed, the first cam and the gear are coaxially disposed.

When the cam is correspondingly connected to the connecting rod, the limiting mechanism further includes: a camshaft fixedly connected to each connecting rod, the camshaft penetrates the first cam and the second cam that are disposed opposite to each other, the first cam can rotate synchronously with the camshaft, and the second cam can rotate relative to the camshaft. A coaxial effect of the first cam and the second cam is ensured by using the camshaft.

The elastic part may be a compression spring, and the camshaft penetrates the compression spring. The camshaft is used as a guiding structure.

When the limiting mechanism is specifically disposed, when there are at least two connecting rod groups, an elastic part is disposed between two second cams corresponding to any two adjacent first cams, and two ends of the elastic part press against the two second cams. The two second cams are driven by using the same elastic part, thereby simplifying a structure.

When the swing arm cooperates with the connecting rod, the swing arm may be slidably connected to one or more connecting rods.

When the swing arms specifically cooperate with the connecting rods, notches in a one-to-one correspondence with the corresponding connecting rods are disposed on the swing arms, and the connecting rods are at least partially located in the corresponding notches, thereby reducing thickness after the connecting rods and the swing arms are connected.

When the swing arm is specifically slidably connected to the connecting rod, first sliding slots are disposed on two sides of the notch on each swing arm, and first protrusions slidably assembled in the first sliding slots are disposed on the corresponding connecting rod.

When the support plate is slidably connected to the swing arm or the connecting rod, a second sliding slot is disposed on each support plate, and a second protrusion slidably assembled in the second sliding slot is disposed on the corresponding connecting rod or swing arm.

When the support plate is rotatably connected to the swing arm, each support plate is rotatably connected to the corresponding swing arm by using first pin shafts; or a second arc-shaped sliding slot is disposed on each support plate, and a second arc-shaped arm slidably assembled in the second arc-shaped sliding slot is disposed on the swing arm corresponding to the support plate. The support plate may rotate relative to the swing arm in different manners.

In an embodiment, the main shaft assembly has a first surface and a second surface opposite to the first surface, and the first surface is a surface used to support the flexible display. When the rotating shaft mechanism is unfolded to support the flexible display, the first surface is flush with a surface that is of the support plate and that is used to support the flexible display. The disposed first surface is flush with the surface that is of the support plate and that supports the flexible display, thereby improving an effect of supporting the flexible display.

In an embodiment, the mobile terminal further includes a flexible blocking layer. The flexible blocking layer is fixedly connected to the surface that is of the main shaft assembly and that faces away from the surface supporting the flexible display, and two ends of the flexible blocking layer are suspended, and are used to be inserted into the two housings of the mobile terminal. The flexible blocking layer can block the notches on the main shaft assembly, thereby improving an appearance effect of the mobile terminal.

In an embodiment, the mobile terminal further includes a flexible blocking layer. The flexible blocking layer is fixedly connected to the surface that is of the main shaft assembly and that faces away from the surface supporting the flexible display, at least one swing arm is rotatably connected to a swing rod, and the swing rod is slidably connected to the flexible blocking layer. Two ends of the flexible blocking layer are fixed by using the swing rod.

In an embodiment, the flexible blocking layer is an elastic steel plate or an elastic plastic plate.

According to a second aspect, a mobile terminal is provided. The mobile terminal includes the rotating shaft mechanism described in any one of the foregoing embodiments, two housings, and a flexible display fixedly connected to the two housings. The two housings are arranged on two sides of the main shaft assembly, and each housing is fixedly connected to a swing arm located on a same side. During use, when the swing arms located on the two sides of the main shaft assembly rotate to a first position in directions towards each other, corresponding connecting rods or the swing arms drive the two support plates to rotate to a second position in directions towards each other, and the support plates and the main shaft assembly enclose folding space for accommodating the flexible display of the mobile terminal. In addition, the connecting rods rotate, and the swing arms rotate relative to the main shaft assembly, so that thickness of a folded folding mechanism is approximately equal to thickness of the two stacked housings, thereby improving an effect of the folded mobile terminal. In addition, the support plates and the main shaft assembly enclose the space for accommodating the flexible display, thereby improving a bending effect of the flexible display.

In an embodiment, the flexible display is connected to the support plates by using adhesive. The flexible display is connected to the support plates by using adhesive, thereby improving a folding effect of the flexible display.

In an embodiment, a flexible blocking layer is inserted into the two housings. A folding effect of the mobile terminal is improved by using the disposed flexible blocking layer.

DESCRIPTION OF EMBODIMENTS

To make the objectives, technical solutions, and advantages of this application clearer, the following further describes this application in detail with reference to the accompanying drawings.

Figure 1:
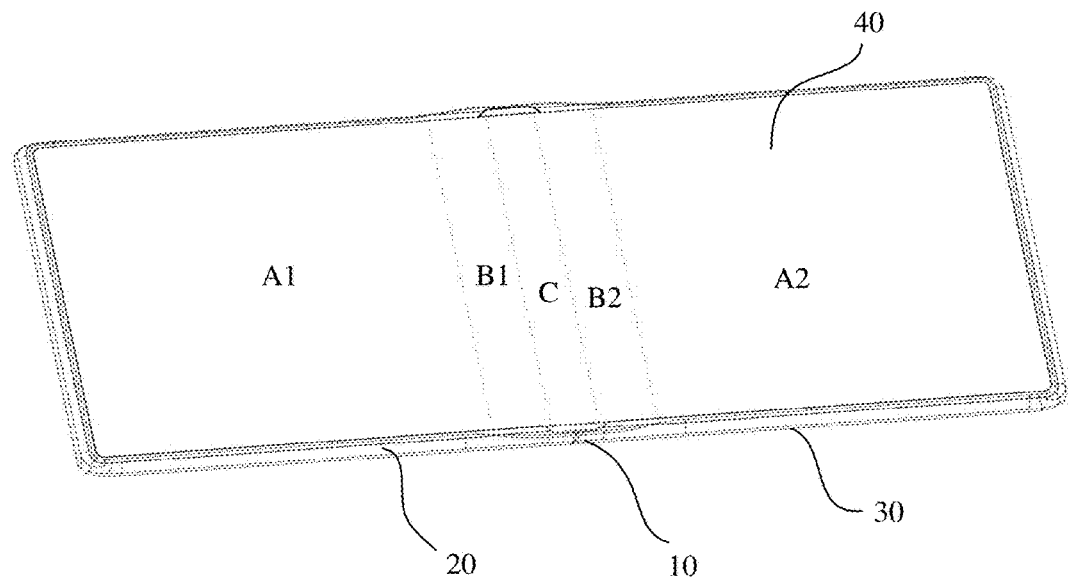
FIG. 1 is a schematic diagram of an unfolded mobile terminal according to an embodiment of this application.
Figure 2:
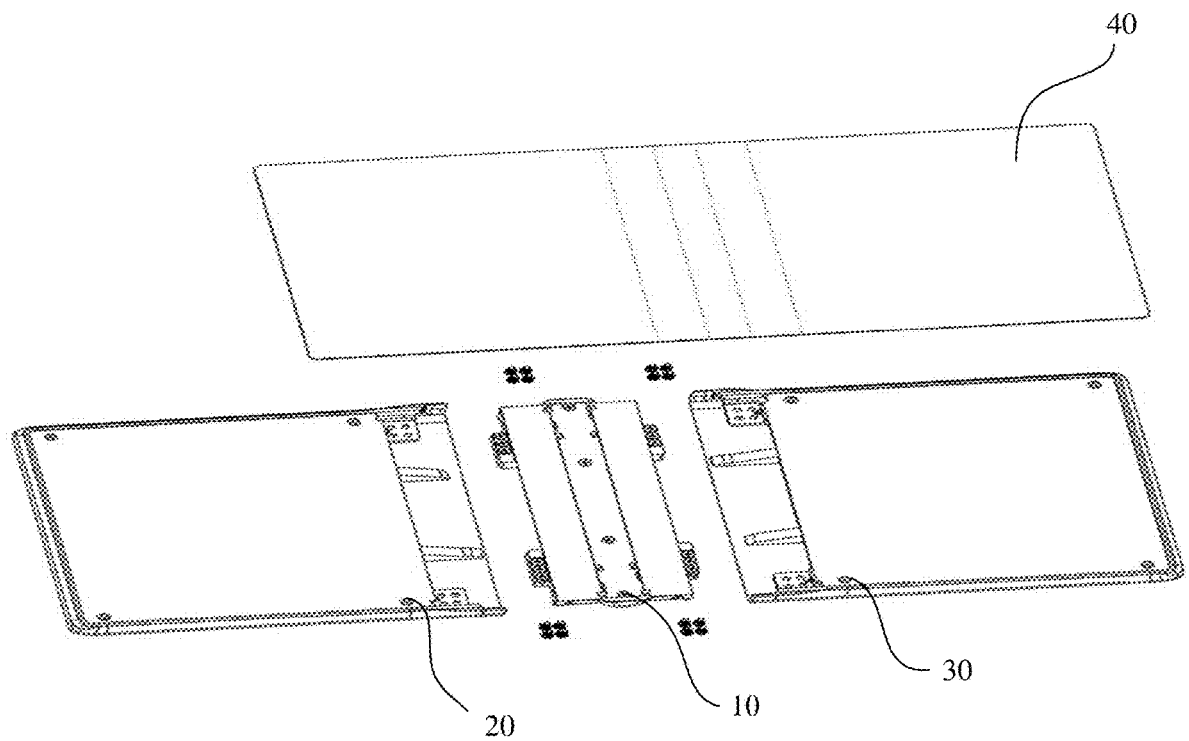
FIG. 2 is a schematic exploded diagram of a mobile terminal according to an embodiment of this application.

To facilitate understanding of a rotating shaft mechanism provided in the embodiments of this application, the following first describes an application scenario of the rotating shaft mechanism. The rotating shaft mechanism is applied to a mobile terminal, and particularly, to a mobile terminal whose display can be bent, for example, a mobile phone, a PDA, a notebook computer, or a tablet computer. However, regardless of which type of mobile terminal is used, the mobile terminal includes a structure shown in FIG. 1: a left housing 20, a rotating shaft mechanism 10, a right housing 30, and a flexible display 40. Referring to FIG. 1 and FIG. 2 together, the rotating shaft mechanism 10 is rotatably connected to the left housing 20 and the right housing 30, and the rotating shaft mechanism 10 rotates to enable the left housing 20 and the right housing 30 to rotate relative to each other. The flexible display 40 covers the left housing 20, the right housing 30, and the rotating shaft mechanism 10, and is separately connected to the left housing 20, the right housing 30, and the rotating shaft mechanism 10 (a connection manner may be adhesive connection or the like), to form the structure shown in FIG. 1. During use, the mobile terminal has two states: an unfolded state and a folded state. First, referring to FIG. 1, FIG. 1 shows the mobile terminal in the unfolded state. In this case, the rotating shaft mechanism 10 is unfolded, and the left housing 20 and the right housing 30 are arranged on two sides of the rotating shaft mechanism 10 and are unfolded. In this case, the flexible display 40 is unfolded. During bending, the left housing 20 and the right housing 30 rotate relative to each other, and the rotating shaft mechanism 10 rotates. After being folded, the mobile terminal is in a state shown in FIG. 3. In this case, the left housing 20 and the right housing 30 are stacked relative to each other, and the flexible display 40 is bent along with the left housing 20 and the right housing 30. To facilitate understanding of the rotating shaft mechanism 10 provided in this embodiment of this application, the following describes a structure of the rotating shaft mechanism 10 in detail with reference to the accompanying drawings.

Figure 4:
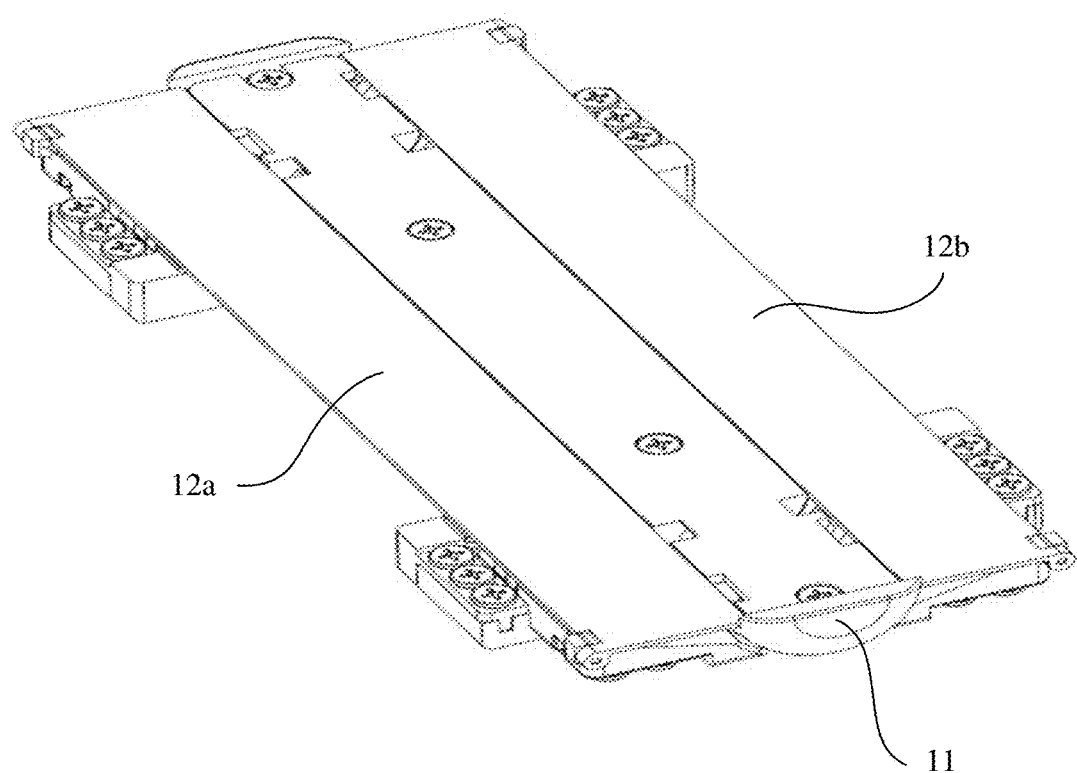
FIG. 4 is a schematic structural diagram of a rotating shaft mechanism according to an embodiment of this application.
Figure 5:
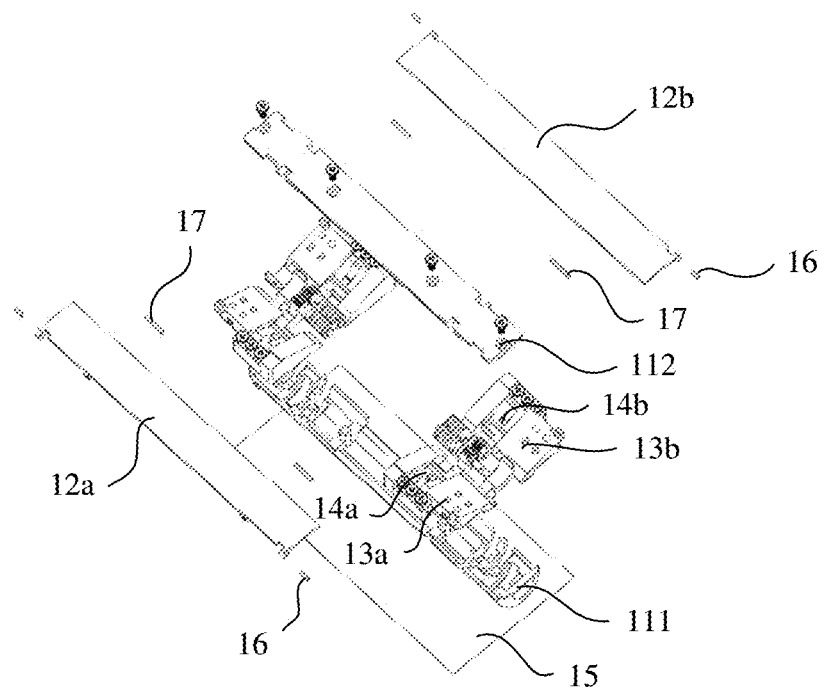
FIG. 5 is a schematic exploded diagram of a rotating shaft mechanism according to an embodiment of this application.

First, referring to FIG. 4 and FIG. 5, FIG. 4 is a schematic structural diagram of the rotating shaft mechanism 10, and FIG. 5 is a schematic exploded diagram of the rotating shaft mechanism 10. The rotating shaft mechanism 10 provided in this embodiment of this application mainly includes three parts: a main shaft assembly 11, swing arm assembly, and a support assembly. The main shaft assembly 11 is a support piece and plays a role of a rotating shaft. The swing arm assembly is configured to connect the two housings of the mobile terminal, and the support assembly is configured to form a structure supporting the flexible display 40. In addition, the swing arm assembly is further used as connecting piece to connect the support assembly and the main shaft assembly 11. This embodiment is described below in detail with reference to specific accompanying drawings.

Figure 3:
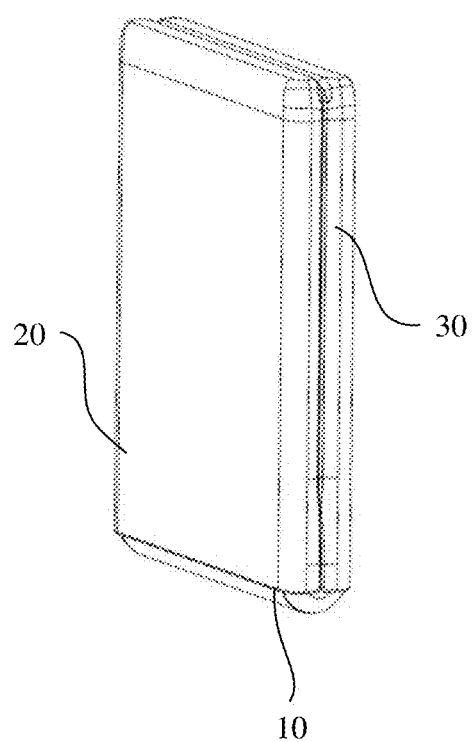
FIG. 3 is a schematic diagram of a mobile terminal in a folded state according to an embodiment of this application.

Still referring to FIG. 4 and FIG. 5, an overall structure of the main shaft assembly 11 provided in this embodiment of this application is a semi-cylinder, and side surfaces of the main shaft assembly 11 include a first surface and a second surface connected to the first surface. The first surface is a plane and is used to support the flexible display 40, and the second surface is an arc-shaped cylindrical surface. For ease of description, a length direction of the main shaft assembly 11 is defined. As shown in FIG. 2 and FIG. 3, the length direction of the main shaft assembly 11 is a direction of axes around which the left housing 20 and the right housing 30 rotate.

When the main shaft assembly 11 is specifically disposed, the main shaft assembly 11 may use different structures. As shown in FIG. 5, the main shaft assembly 11 includes two parts, namely, a main inner shaft 112 and a main outer shaft 111, and the main inner shaft 112 is fixedly connected to the main outer shaft 111. Referring to FIG. 4 and FIG. 5 together, the main inner shaft 112 and the main outer shaft 111 are detachably and fixedly connected by using screws. In an embodiment, in addition to the connection manner shown in FIG. 4, the main inner shaft 112 may be fixedly connected to the main outer shaft 111 by using a buckle or a rivet. When the main inner shaft 112 and the main outer shaft 111 are specifically disposed, the first surface is a surface of the main inner shaft 112, and the second surface is a surface of the main outer shaft 111. In an embodiment, it should be understood that a split structure used by the main shaft assembly 11 is merely a specific example. The main shaft assembly 11 provided in this embodiment of this application may alternatively use another structure. In addition, when the main shaft assembly 11 supports the swing arm assembly, a structure corresponding to the swing arm assembly is disposed on the main shaft assembly 11. For ease of understanding of an internal structure of the main shaft assembly 11, the following describes a structure in the main shaft assembly 11 with reference to the swing arm assembly.

Figure 6:
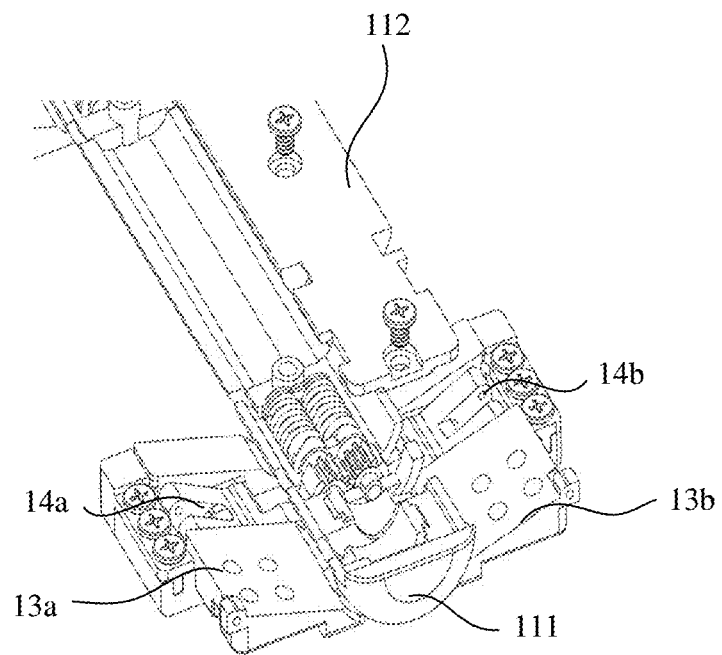
FIG. 6 is a schematic diagram of cooperation between a swing arm assembly and a main shaft assembly according to an embodiment of this application.

Referring to FIG. 5 and FIG. 6 together, the swing arm assembly provided in this embodiment of this application includes two main structures: a connecting rod group and a swing arm group. The connecting rod group is configured to connect the swing arm group and the main shaft assembly 11, and the swing arm group is configured to be connected to the housings. A quantity of the connecting rod groups and a quantity of the swing arm groups may be determined according to a requirement, for example, one swing arm group and one connecting rod group are disposed, or two swing arm groups and two connecting rod groups are disposed, or two swing arm groups and three connecting rod groups are disposed. One swing arm group may correspond to one connecting rod group, or one swing arm group may correspond to a plurality of connecting rod groups, and this may be determined according to an actual requirement during specific disposing. As shown in FIG. 5 and FIG. 6, two swing arm groups and two connecting rod groups are used in the structures shown in FIG. 5 and FIG. 6, and the swing arm groups are in a one-to-one correspondence with the connecting rod groups. However, it should be understood that in the swing arm assembly provided in this embodiment of this application, one swing arm group may correspond to two connecting rod groups or another correspondence may be used.

Figure 7:
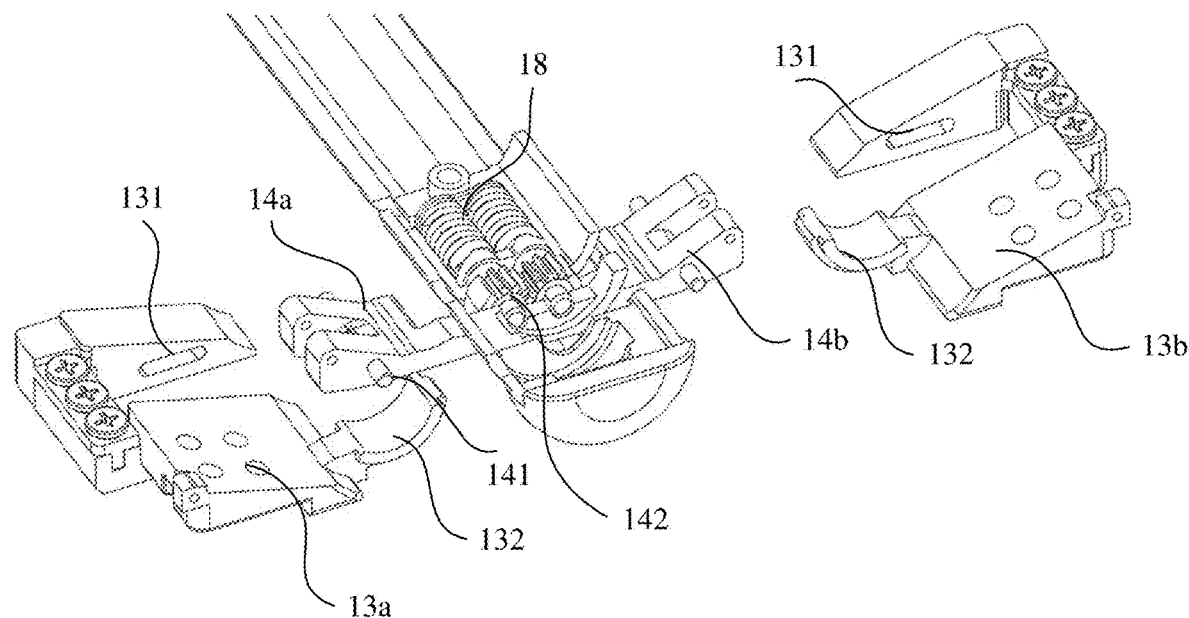
FIG. 7 is a schematic exploded diagram of a swing arm assembly and a main shaft assembly according to an embodiment of this application.
Figure 8:
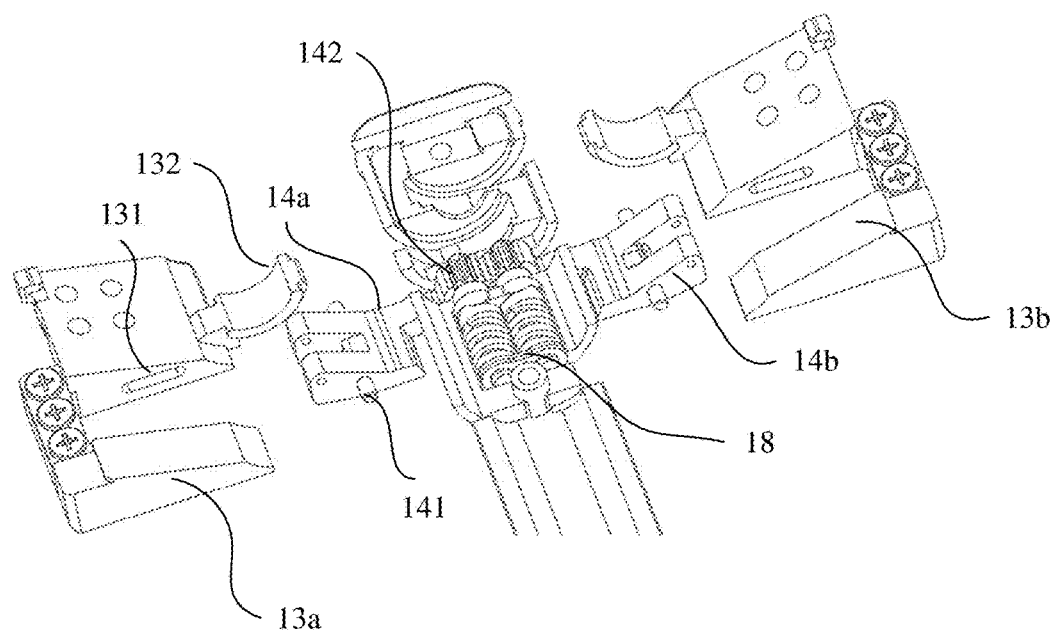
FIG. 8 is a schematic exploded diagram of a swing arm assembly and a main shaft assembly according to an embodiment of this application.

First, the connecting rod groups are described. In this application, the connecting rod groups have a same structure. As shown in FIG. 7 and FIG. 8, FIG. 7 and FIG. 8 show structures of connection between the connecting rod groups in the two swing arm assemblies in FIG. 5 and the main shaft assembly 11. It can be learned from FIG. 7 and FIG. 8 that the two connecting rod groups are connected to the main shaft assembly 11 in a same manner. Therefore, one connecting rod group is used as an example. As shown in FIG. 5, the connecting rod group includes two connecting rods. For ease of description, the two connecting rods are named a left connecting rod 14a and a right connecting rod 14b. When the left connecting rod 14a and the right connecting rod 14b are disposed, the two connecting rods are correspondingly disposed on two sides of the main shaft assembly 11. As shown in FIG. 8, the left connecting rod 14a and the right connecting rod 14b are arranged on the two sides of the main shaft assembly 11 in the length direction of the main shaft assembly 11, and are rotatably connected to the main shaft assembly 11. For ease of describing a rotation relationship between the connecting rod group and the main shaft assembly 11, description is provided by using an example in which the main shaft assembly 11 includes the main outer shaft 111 and the main inner shaft 112. Still referring to FIG. 5 and FIG. 6, the main outer shaft 111 is an arc-shaped housing, and a groove is disposed in the arc-shaped housing. When the main outer shaft 111 is fixedly connected to the main inner shaft 112, the main inner shaft 112 covers the groove to form a cavity 113 shown in FIG. 9. The left connecting rod 14a and the right connecting rod 14b are separately inserted into the cavity 113. In addition, an end of each of the left connecting rod 14a and the right connecting rod 14b inserted into the cavity 113 is connected to a shaft 143, and the shaft 143 is rotatably connected to the main shaft assembly 11. During specific connection, grooves having a semicircular cross section are designed on each of the main inner shaft 112 and the main outer shaft 111, holes having a circular cross section are formed after the main inner shaft 112 and the main outer shaft 111 are assembled, and the holes having a circular cross section fit with the shafts 143 of the connecting rods. In an embodiment, circular holes may be alternatively disposed on the main inner shaft 112 or the main outer shaft 111, so that the shafts 143 penetrate the holes. When the left connecting rod 14a and the right connecting rod 14b rotate, the left connecting rod 14a and the right connecting rod 14b can rotate around the shafts 143, to rotate relative to the main shaft assembly 11. When the shafts 143 are specifically disposed, referring to FIG. 8 and FIG. 9 together, the shafts 143 around which the left connecting rod 14a and the right connecting rod 14b rotate are parallel to the length direction of the main shaft assembly 11. In this case, axes around which the left connecting rod 14a and the right connecting rod 14b rotate are parallel to the length direction of the main shaft assembly 11.

Figure 9:
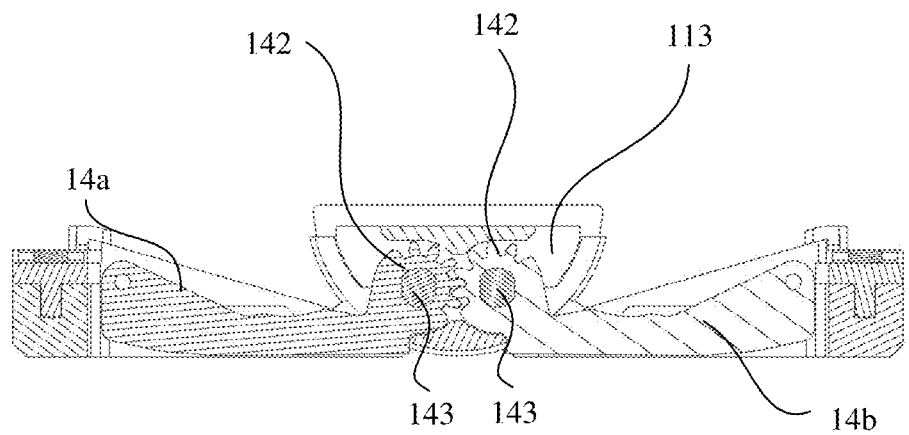
FIG. 9 is a schematic exploded diagram of a connecting rod group and a main shaft assembly according to an embodiment of this application.

Still referring to FIG. 7 and FIG. 8, the connecting rod is strip-shaped. Referring to FIG. 9 together, one end of each of the left connecting rod 14a and the right connecting rod 14b is located in the main shaft assembly 11, and the other end extends to the outside of the main shaft assembly 11. In addition, notches fitting with the left connecting rod 14a and the right connecting rod 14b are correspondingly disposed on the main outer shaft 111, so that the left connecting rod 14a and the right connecting rod 14b have relatively large rotation space. In addition, the end that is of each of the left connecting rod 14a and the right connecting rod 14b and that is exposed outside the main shaft assembly 11 is used to be slidably connected to a swing arm in the swing arm group. For ease of understanding of a connection relationship between the connecting rod group and the swing arm group, a structure of the swing arm group is described below in detail.

First, referring to FIG. 7 and FIG. 8, the swing arm group provided in this embodiment of this application includes two swing arms. For ease of description, the two swing arms are named a left swing arm 13a and a right swing arm 13b, and the left swing arm 13a and the right swing arm 13b are configured to be fixedly connected to the two housings of the mobile terminal. Referring to FIG. 2 and FIG. 5 together, the left swing arm 13a is fixedly connected to the left housing 20, and the right swing arm 13b is fixedly connected to the right housing 30. During specific fixed connection, a bolt or a screw may be used for fixed connection. In this case, the left swing arm 13a and the right swing arm 13b move synchronously with the left housing 20 and the right housing 30, respectively. When the two swing arms are specifically disposed, the left swing arm 13a and the right swing arm 13b are disposed on the two sides of the main shaft assembly 11. More specifically, the left swing arm 13a and the right swing arm 13b are arranged on the two sides of the main shaft assembly 11 in the length direction of the main shaft assembly 11. The left swing arm 13a and the right swing arm 13b are connected to the connecting rods and the main shaft assembly 11 in a same manner. Therefore, the left swing arm 13a is used as an example for description.

When the left swing arm 13a is specifically connected to the main shaft assembly 11, the left swing arm 13a is rotatably connected to the main shaft assembly 11. In addition, an axis around which the left swing arm 13a rotates is different from an axis around which the corresponding connecting rod rotates. Although the left swing arm 13a and the corresponding connecting rod rotate around different axes, both the axis around which the left swing arm 13a rotates and the axis around which the corresponding connecting rod rotates are parallel to the length direction of the main shaft assembly 11.

Figure 10:
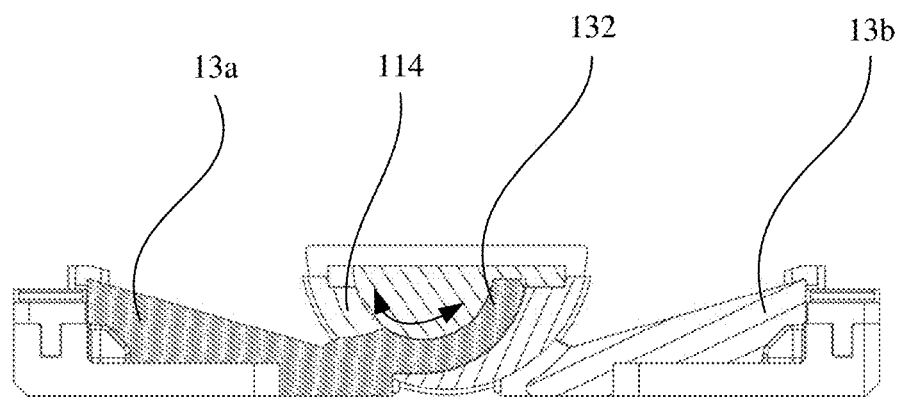
FIG. 10 is a schematic exploded diagram of a swing arm group and a main shaft assembly according to an embodiment of this application.

When the left swing arm 13a is specifically rotatably connected to the main shaft assembly 11, FIG. 10 shows a specific structure of rotatable connection between the left swing arm 13a and the main shaft assembly 11. During specific disposing, a first arc-shaped sliding slot 114 is disposed in the main shaft assembly 11, and the left swing arm 13a is slidably assembled in the first arc-shaped sliding slot 114. When the left swing arm 13a slides relative to the main shaft assembly 11, the left swing arm 13a simultaneously rotates relative to the main shaft assembly 11. Referring to FIG. 5 together, when the main shaft assembly 11 includes the main inner shaft 112 and the main outer shaft 111, an arc-shaped surface is disposed in the main inner shaft 112, and the arc-shaped surface is a convex arc-shaped surface. In addition, during specific disposing, the arc-shaped surface is opposite to the first surface of the main inner shaft 112. Correspondingly, a concave arc-shaped groove is disposed on the main outer shaft 111, and the arc-shaped groove is disposed on a surface of the main outer shaft 111 opposite to the second surface. As shown in FIG. 10, when the main outer shaft 111 is fixedly connected to the main inner shaft 112, the arc-shaped surface covers the arc-shaped groove to form the first arc-shaped sliding slot 114. In an embodiment, the first arc-shaped sliding slot 114 may be alternatively directly formed on the main outer shaft 111 or the main inner shaft 112 by using an integral structure. In this case, when the first arc-shaped sliding slot 114 is disposed, the first arc-shaped sliding slot may be directly fabricated on the main outer shaft 111 or the main inner shaft 112 when the main outer shaft 111 or the main inner shaft 112 is fabricated. When this fabrication manner is used, precision of a sliding slot during fabrication can be improved, and it facilitates assembly of the swing arm. When the left swing arm 13a is slidably assembled in the first arc-shaped sliding slot 114, a first arc-shaped arm 132 configured to be slidably assembled in the corresponding first arc-shaped sliding slot 114 is disposed on the left swing arm 13a. As shown in FIG. 7 and FIG. 8, FIG. 7 and FIG. 8 show that the first arc-shaped arm 132 is disposed on the left swing arm 13a, and one end of the first arc-shaped arm 132 is fixedly connected to one end of the left swing arm 13a. However, it should be understood that in the rotating shaft mechanism 10 provided in this embodiment of this application, a quantity of corresponding first arc-shaped arms 132 of a swing arm is not limited. One first arc-shaped arm 132 may be disposed on one swing arm, as shown in FIG. 7 and FIG. 8, or a plurality of first arc-shaped arms 132, for example, two, three, or four first arc-shaped arms, may be disposed on one swing arm. However, regardless of a quantity of used first arc-shaped arms 132, all the first arc-shaped arms 132 are slidably assembled in the first arc-shaped sliding slot 114. As shown in FIG. 10, the first arc-shaped arm 132 is assembled in the first arc-shaped sliding slot 114, and a radian of the first arc-shaped arm 132 is the same as a radian of the first arc-shaped sliding slot 114. Therefore, when the left swing arm 13*a* slides, the left swing arm 13*a* slides in a length direction of the first arc-shaped sliding slot 114. Because the first arc-shaped sliding slot 114 is an arc-shaped sliding slot, during sliding, the left swing arm 13*a* may rotate relative to the main shaft assembly 11 in directions indicated by arrows shown in FIG. 10. The directions are rotation directions of the left swing arm 13*a*. It can be learned from FIG. 10 that when the left swing arm 13*a* slides, the left swing arm 13*a* may slide in an arc-shaped direction defined by the first arc-shaped sliding slot 114, and can rotate relative to the main shaft assembly 11 while sliding. When the left swing arm 13*a* is fixedly connected to the left housing 20, rotation of the left swing arm 13*a* relative to the main shaft assembly 11 may drive the left housing 20 to rotate relative to the main shaft assembly 11, to unfold or fold the mobile terminal.

Still referring to FIG. 7 and FIG. 8, when the right swing arm 13*b* is specifically disposed, a manner of connection between the right swing arm 13*b* and the main shaft assembly 11 is the same as that of the left swing arm 13*a*. Therefore, details are not described herein again. However, when a first arc-shaped arm 132 of the right swing arm 13*b* is specifically disposed, the first arc-shaped arm 132 may be disposed in a manner different from the manner of disposing the first arc-shaped arm 132 on the left swing arm 13*a*. As shown in FIG. 7 and FIG. 8, when the left swing arm 13*a* and the right swing arm 13*b* are specifically disposed, the first arc-shaped arms 132 of the left swing arm 13*a* and the right swing arm 13*b* are staggered. The staggering means that there is a position difference between the first arc-shaped arms 132 correspondingly connected to the two swing arms, in an axial direction of the main shaft assembly 11. After the first arc-shaped arms 132 are assembled in the main shaft assembly 11, the first arc-shaped arm 132 of the left swing arm 13*a* and the first arc-shaped arm 132 of the right swing arm 13*b* are arranged in rows in the axial direction of the main shaft assembly 11. When the first arc-shaped arms are disposed in this manner, as shown in FIG. 10, the first arc-shaped arm 132 of the left swing arm 13*a* may be in relatively large contact with the main shaft assembly 11, that is, a length of the first arc-shaped arm 132 extending into the first arc-shaped sliding slot 114 is relatively long. The left swing arm 13*a* shown in FIG. 10 is used as an example. When the mobile terminal is folded, the left swing arm 13*a* rotates relative to the main shaft assembly 11 by 90 degrees, and therefore drives the first arc-shaped arm 132 to rotate relative to the main shaft assembly 11 by over 90 degrees. A contact length between the first arc-shaped arm 132 and the main shaft assembly 11 shown in FIG. 10 is obviously greater than 90 degrees. Therefore, it is ensured that the first arc-shaped arm 132 does not slide out of the first arc-shaped sliding slot 114 in a folded state, thereby improving stability when the entire swing arm is slidably connected to the main shaft assembly 11. In an embodiment, when the rotating shaft mechanism 10 uses a plurality of swing arm groups, the foregoing disposing manner may also be used. In this case, the first arc-shaped arms 132 correspondingly disposed on the two swing arms in each swing arm group are disposed in a staggered manner. In addition, FIG. 10 shows only an example embodiment. In the swing arm group provided in this embodiment of this application, the first arc-shaped arms 132 of the two swing arms may be alternatively symmetrically disposed. In this case, the first arc-shaped arms 132 of the left swing arm 13*a* and the right swing arm 13*b* are symmetrically disposed.

Because the axis around which the connecting rod rotates is different from the axis around which the swing arm rotates, when the swing arm and the connecting rod rotate relative to the main shaft assembly 11, the swing arm and the connecting rod slide and rotate relative to each other. Therefore, when the swing arm is connected to the connecting rod, the swing arm is slidably connected to the corresponding connecting rod, and the connecting rod and the swing arm can rotate relative to each other. Referring to FIG. 6 and FIG. 7 together, FIG. 6 and FIG. 7 show a specific manner of connection between the swing arm and the connecting rod. When the swing arms in the swing arm group are connected to the connecting rods in the connecting rod group, the two swing arms in the swing arm group are connected to the corresponding connecting rods in a same manner. Therefore, the left swing arm 13*a* and the left connecting rod 14*a* are used as an example for description.

Referring to FIG. 7 and FIG. 8 together, FIG. 7 and FIG. 8 are schematic exploded diagrams of left swing arms 13*a* in different swing arm groups and left connecting rods 14*a*. During specific assembly of the left swing arm 13*a* and the left connecting rod 14*a*, first sliding slots 131 are disposed on the left swing arm 13*a*, and correspondingly, first protrusions 141 are disposed on the left connecting rod 14*a*. During slidable assembly, the first protrusions 141 slide in the first sliding slots 131, to implement slidable connection between the left swing arm 13*a* and the left connecting rod 14*a*. When the first protrusions 141 slide, the first protrusions 141 may rotate relative to the first sliding slots 131, so that the left swing arm 13*a* and the left connecting rod 14*a* rotate when sliding relative to each other. In addition, to avoid occurrence of interference when the left swing arm 13*a* and the left connecting rod 14*a* rotate relative to the main shaft assembly 11, when the left swing arm 13*a* is disposed, a notch (not marked in the figure) is disposed on the left swing arm 13*a*, and when the left connecting rod 14*a* is connected to the left swing arm 13*a*, the left connecting rod 14*a* is at least partially located in the notch on the left swing arm 13*a*. Disposing the notch can effectively reduce thickness of the main shaft assembly 11 after assembly, facilitating fitting with the flexible display 40 of the mobile terminal. Specifically, the notch may be formed when the left swing arm 13*a* is fabricated. For example, when the left swing arm 13*a* uses an integral structure, a notch may be directly fabricated on the left swing arm 13*a*. The notch may be directly formed when the left swing arm 13*a* is fabricated, or the notch may be formed by using a tool after the left swing arm 13*a* is fabricated. In an embodiment, the swing arm may be alternatively of an assembly structure. As shown in FIG. 7, a structure of the swing arm includes two parts: a first portion and a second portion. The first portion is connected to the first arc-shaped arm 132, the first portion is strip-shaped, and the second portion is 7-shaped. During connection, the first portion is connected to a horizontal part of the second portion, so that a notch is formed between the first portion and a vertical part of the second portion.

When the first sliding slots 131 and the first protrusions 141 are specifically disposed, there are two first sliding slots 131, and the two first sliding slots 131 are disposed on two opposite side walls of the notch on the swing arm. In addition, when the first sliding slots 131 are disposed, the first sliding slot 131 may be a line groove or an arc-shaped groove, and may be disposed according to a requirement during specific disposing. For example, the first sliding slot 131 in FIG. 8 is a line groove. Correspondingly, there are also two first protrusions 141, and the two first protrusions 141 are correspondingly disposed on two sides of the left connecting rod 14a.

In the foregoing embodiment, a manner of connection between the right swing arm 13b and the right connecting rod 14b is the same as the manner of connection between the left swing arm 13a and the left connecting rod 14a. Therefore, details are not described herein again. When the axes of the swing arms and the corresponding connecting rods are specifically disposed, the two swing arms in each swing arm group may be rotatably connected to the main shaft assembly around a same axis or around different axes. Axes around which the two connecting rods in each connecting rod group rotate are symmetrically disposed on two sides of the axes around which the two swing arms in the corresponding swing arm group rotate. Referring to FIG. 9 and FIG. 10 together, as shown in FIG. 10, when the axes around which the swing arms rotate are specifically disposed, the axes around which the swing arms rotate are virtual axes and are located outside the first surface. Referring to FIG. 9 together, as shown in FIG. 9, the shafts 143 around which the connecting rods rotate are located in the main shaft assembly 11. Therefore, the axes around which the swing arms rotate are located above the axes around which the connecting rods rotate, and the shafts 143 corresponding to the two connecting rods are symmetrically located on two sides of the axes around which the swing arms rotate.

When the swing arm group cooperates with the connecting rod group, notches in a one-to-one correspondence with the corresponding connecting rods are disposed on the swing arms, and the connecting rods are at least partially located in the corresponding notches. When the first sliding slots 131 are disposed, the first sliding slots 131 are disposed on two sides of the notch on each corresponding swing arm. The first protrusions 141 slidably assembled in the first sliding slots 131 are disposed on the corresponding connecting rod, to implement slidable connection between the swing arm and the corresponding connecting rod.

When the connecting rod slides relative to the swing arm, a sliding direction of the connecting rod is perpendicular to an axial direction of the connecting rod. When the swing arms located on the two sides of the main shaft assembly 11 rotate to a first position in directions towards each other, the two swing arms are relatively close to each other, and the mobile terminal is in the folded state. The corresponding connecting rods slide to positions close to the axes around which the swing arms rotate. When the swing arms located on the two sides of the main shaft assembly 11 rotate in opposite directions to the unfolded state, the two swing arms are arranged on the two sides of the main shaft assembly 11, and the connecting rods slide, relative to the corresponding swing arms, to ends of the swing arms away from the main shaft assembly 11. It can be learned from the foregoing description that when the mobile terminal is switched from the unfolded state to the folded state, when the connecting rods slide relative to the corresponding swing arms, the connecting rods slide from sides of the swing arms away from the main shaft assembly 11 to sides of the swing arms close to the main shaft assembly 11. When the mobile terminal is switched from the folded state to the unfolded state, when the connecting rods slide relative to the corresponding swing arms, the connecting rods slide from sides of the swing arms close to the main shaft assembly 11 to sides of the swing arm away from the main shaft assembly 11.

It should be understood that although each swing arm corresponds to one connecting rod in FIG. 7 and FIG. 8, in the rotating shaft mechanism 10 provided in this embodiment of this application, a quantity of swing arms and a quantity of corresponding connecting rods are not limited, for example, each swing arm corresponds to two, three, four, or another different quantity of connecting rods. To be specific, any solution can be applied to this embodiment of this application provided that each swing arm is slidably connected to at least one connecting rod located on a same side.

In addition, when the swing arm assembly are used, when the left housing 20 and the right housing 30 rotate relative to each other, the left connecting rod 14a and the right connecting rod 14b are driven to rotate relative to each other. To ensure synchronization between the left housing 20 and the right housing 30, gears 142 are respectively disposed on opposite ends of the two connecting rods in each connecting rod group. Still referring to FIG. 7 and FIG. 9, one gear 142 is disposed on each of opposite ends of the left connecting rod 14a and the right connecting rod 14b. To be specific, a gear 142 is disposed on each of an end of the left connecting rod 14a and an end of the right connecting rod 14b that are located in the cavity 113, and the two gears 142 engage with each other when the left connecting rod 14a and the right connecting rod 14b are assembled. When the end of the left connecting rod 14a and the end of the right connecting rod 14b are located in the cavity 113 of the main shaft assembly 11, the two gears 142 are located in the cavity 113, and the shafts around which the left connecting rod 14a and the right connecting rod 14b rotate relative to the main shaft assembly 11 respectively penetrate the two gears 142. When the left connecting rod 14a or the right connecting rod 14b rotates, the engaging gears 142 drive the other connecting rod to rotate, to implement synchronous rotation between the left connecting rod 14a and the right connecting rod 14b. Further, the left connecting rod 14a and the right connecting rod 14b drive, by using the swing arm group, the two housings to be unfolded or folded synchronously.

When the mobile terminal is used, the mobile terminal needs to be stable in a specific state, for example, in the folded state or the unfolded state. Therefore, when the rotating shaft mechanism is disposed, a limiting mechanism 18 is disposed for relative rotation between the left housing 20 and the right housing 30. For example, relative positions at which the connecting rods rotate relative to the main shaft assembly 11 are limited, and positions at which the left connecting rod 14a and the right connecting rod 14b rotate relative to each other may be limited by using the limiting mechanism 18, to further limit relative positions of the left housing 20 and the right housing 30 of the mobile terminal. Alternatively, relative positions at which the swing arms rotate relative to the main shaft assembly 11 may be limited. To be specific, positions at which the left swing arm 13a and the right swing arm 13b rotate relative to each other are limited, to further limit a relative position relationship between the left housing 20 and the right housing 30. When the limiting mechanism is specifically disposed, different structures may be used. The following describes the structures with reference to the accompanying drawings.

First, for each connecting rod group, when the left connecting rod 14a and the right connecting rod 14b engage by using the gears 142, such a selection may be made that only a rotation position of the left connecting rod 14a is limited, or only a rotation position of the right connecting rod 14b is limited, or rotation positions of the left connecting rod 14a and the right connecting rod 14b are limited at the same time. When there is no gear 142 engaging between the left connecting rod 14a and the right connecting rod 14b, the rotation positions of the left connecting rod 14a and the right connecting rod 14b need to be limited at the same time. However, regardless of which limiting manner is used, a same limiting structure is used for the connecting rods. Therefore, the following gives description that both the left connecting rod 14a and the right connecting rod 14b are limited.

Figure 11:
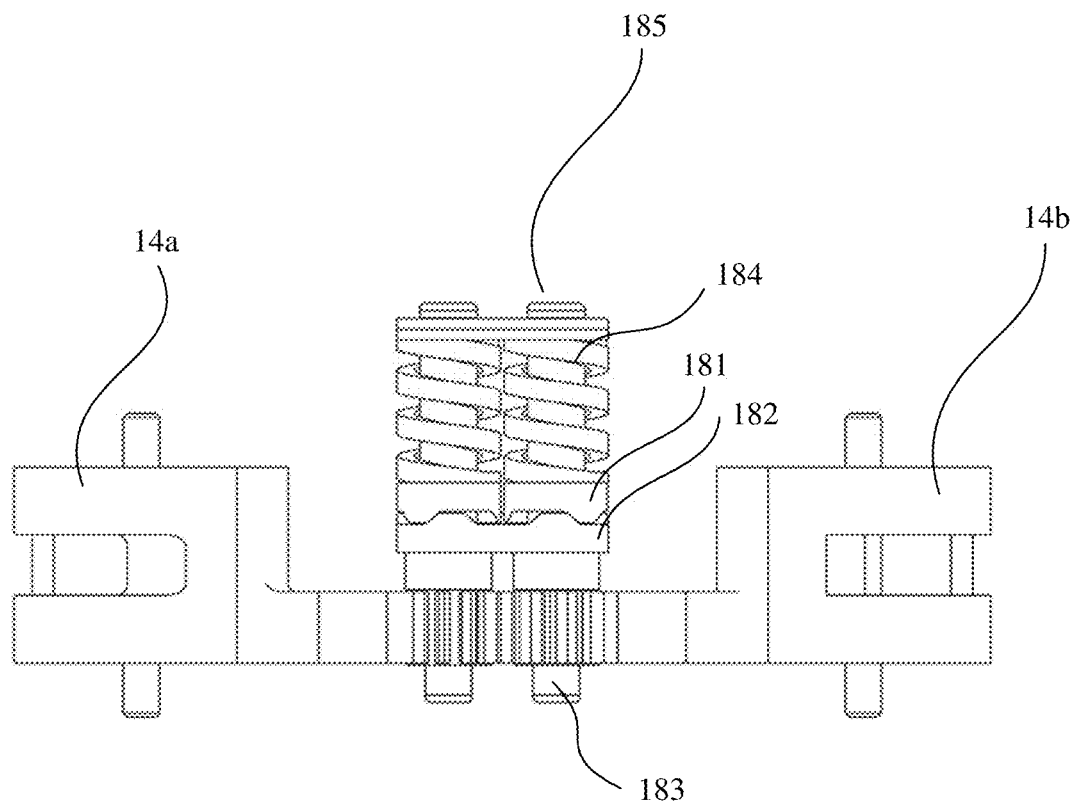
FIG. 11 is a schematic structural diagram of a limiting mechanism according to an embodiment of this application.
Figure 12:
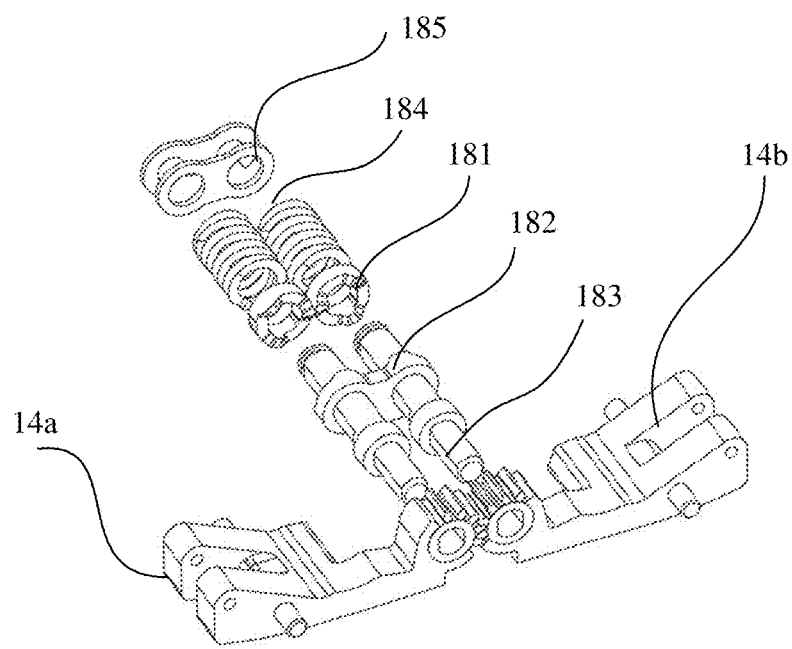
FIG. 12 is a schematic exploded diagram of a limiting mechanism according to an embodiment of this application.

Referring to FIG. 11 and FIG. 12, FIG. 11 shows a cooperation relationship between the limiting mechanism 18 and the connecting rods, and FIG. 12 is a schematic exploded diagram of the limiting mechanism 18 and the connecting rods. In the structures shown in FIG. 11 and FIG. 12, the limiting mechanism 18 includes a first cam 181 that rotates synchronously with each connecting rod, and a second cam 182 disposed opposite to each first cam 181. Protrusions and notches that engage with each other are disposed on opposite sides of the first cam 181 and the second cam 182 that are disposed opposite to each other. When the first cam 181 and the second cam 182 are disposed, one of the first cam 181 and the second cam 182 may slide relative to the main shaft assembly 11, to implement engaging and disengaging between the notches and the protrusions. When the relative sliding between the first cam 181 and the second cam 182 is specifically set, the first cam 181 may be fixed while the second cam 182 may slide, or the second cam 182 may be fixed while the first cam 181 may slide, or both the first cam 181 and the second cam 182 may slide. When the first cam 181 and the second cam 182 are specifically disposed, as shown in FIG. 11 and FIG. 12, the first cam 181 and the corresponding gear 142 are coaxially disposed. When the gear 142 and the corresponding cam are specifically coaxially disposed, the gear 142 of each connecting rod is coaxially and fixedly connected to one camshaft 183, and the camshaft 183 is a shaft around which the connecting rod rotates. The camshaft 183 penetrates the first cam 181 and the second cam 182 that are disposed opposite to each other, and the first cam 181 can rotate synchronously with the camshaft 183. In an embodiment, the camshaft 183 uses a rectangular shaft, and correspondingly, a flat hole corresponding to the rectangular shaft is correspondingly disposed on the second cam 182, so that when the camshaft 183 rotates, the first cam 181 can rotate synchronously with the gear 142, and the second cam 182 can rotate relative to the camshaft 183. In an embodiment, when the camshaft 183 is a rectangular shaft, a through hole that the camshaft 183 penetrates is disposed on the second cam 182. Therefore, the second cam 182 can rotate relative to the camshaft 183. In addition, the second cam 182 is fixed (cannot rotate) relative to the main shaft assembly 11. When the connecting rod rotates, the protrusions and the notches on the first cam 181 may continuously fit with the protrusions and the notches on the second cam 182, to implement limitation at different positions. In an embodiment, when the connecting rod is not connected to the gear 142, the camshaft is disposed on the end that is of the connecting rod and that is located inside the main shaft assembly 11.

When the first cam 181 and the second cam 182 perform relative limiting, thrust is needed to push the first cam 181 or the second cam 182 to slide towards the other corresponding cam, so that the protrusions and the notches on the first cam 181 and the second cam 182 can engage with each other. In an embodiment, an elastic part is used. The elastic part may be specifically a compression spring 184 or elastic rubber. In the structure shown in FIG. 11, the compression spring 184 is used as the elastic part. During use, as shown in FIG. 12, the compression spring 184 is sleeved on the camshaft 183, and a limiting sheet or a limiting snap ring 185 is disposed on one end of the camshaft 183, two ends of the compression spring 184 press against the first cam 181 and the limiting sheet or the limiting snap ring 185. When the gear 142 rotates, the first cam 181 is driven to rotate, and the disposed compression spring 184 pushes the first cam 181 to press against the second cam 182, so that the first cam 181 and the second cam 182 rotate relative to each other. Still referring to FIG. 11, in positions of the first cam 181 and the second cam 182 shown in FIG. 11, the first cam 181 is away from the gear 142, and the second cam 182 is close to the gear 142. However, it should be understood that a relative position relationship between the first cam 181 and the second cam 182 is not limited to that shown in FIG. 11. In the limiting mechanism 18 provided in this embodiment of this application, the first cam 181 may be close to the gear 142, and the second cam 182 may be away from the gear 142.

Figure 13:
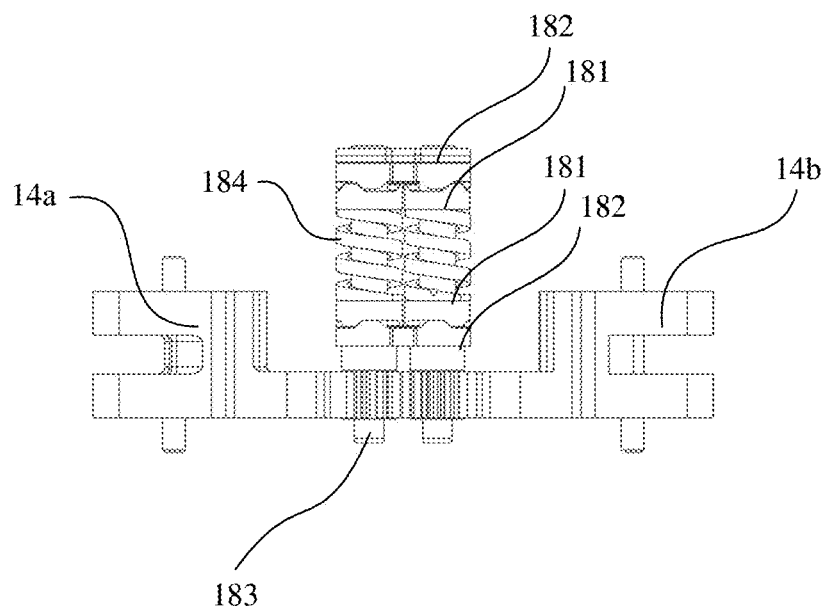
FIG. 13 is a schematic structural diagram of another limiting mechanism according to an embodiment of this application.
Figure 14:
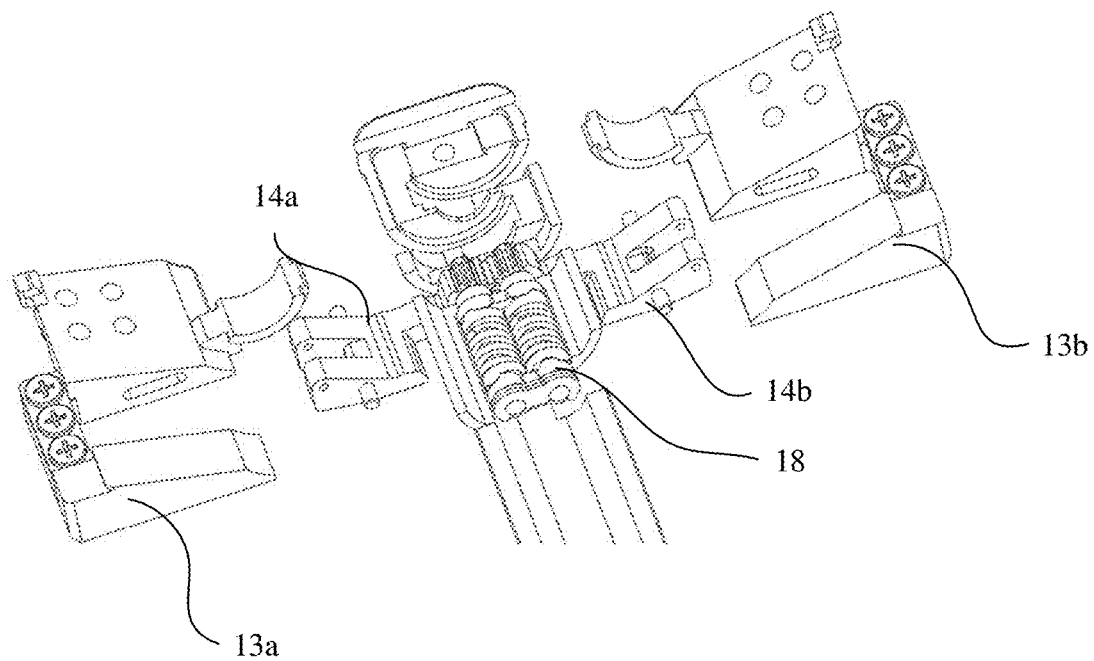
FIG. 14 is a schematic assembly diagram of another limiting mechanism according to an embodiment of this application.

Referring to FIG. 13 and FIG. 14 together, FIG. 13 shows another limiting mechanism 18. One pair of first cam 181 and second cam 182 is added in the limiting mechanism 18. In other words, in the limiting mechanism 18 shown in FIG. 13, cooperation between two pairs of first cams 181 and second cams 182 is used. A manner of cooperation between each pair of the first cam 181 and the second cam 182 is the same as the manner shown in FIG. 11. Therefore, details are not described herein again. When the two pairs of first cams 181 and second cams 182 are used, two ends of the compression spring 184 are disposed between the two first cams 181.

Referring to FIG. 11 and FIG. 13 together, when the second cams 182 are disposed, the second cams 182 need to be fixed relative to the main shaft assembly 11. However, the second cams 182 may be disposed in different manners. As shown in FIG. 11 and FIG. 12, the two second cams 182 use an integral structure, so that when the camshafts 183 rotate, the second cams 182 do not rotate relative to the main shaft assembly 11. In an embodiment, another manner may be alternatively used. For example, the two second cams 182 are separately disposed, but corresponding grooves are disposed inside the main shaft assembly 11 to fix the two second cams 182. In this manner, the second cams 182 can also be fixed relative to the main shaft assembly 11.

For the limiting mechanism 18, positions of the housings of the mobile terminal may be alternatively limited by limiting rotation of the swing arms. Referring to the structures shown in FIG. 7 and FIG. 8, when the staggered first arc-shaped arms 132 are used between the left swing arm 13a and the right swing arm 13b, when the left swing arm 13a and the right swing arm 13b rotate, the two first arc-shaped arms 132 have two opposite surfaces, and an elastic protrusion and a slot may be respectively disposed on the two surfaces. The disposed elastic protrusion and slot cooperate with each other, to limit rotation positions of the two swing arms, and play a limiting role. It should be understood that cooperation between the elastic protrusion and the slot is a common engaging manner in the field, and therefore a structure thereof is not described in detail.

In addition, when the rotating shaft mechanism 10 includes at least two connecting rod groups, each connecting rod group corresponds to one pair of the first cam 181 and the second cam 182 for limiting. However, when the elastic part is disposed, one elastic part may be used to provide an elastic force needed by the first cam 181. In this case, an elastic part is disposed between two second cams 182 corresponding to any two adjacent first cams 181, and two ends of the elastic part press against the two second cams 182. Alternatively, two ends of the elastic part specifically press against the two first cams 181. Whether the elastic part specifically presses against the first cams 181 or the second cams 182 may be determined based on actual positions for disposing the cams, so that a quantity of used elastic parts can be reduced, to simplify an entire mechanism.

It can be learned from the foregoing description that the first cams 181 and the second cams 182 can limit the rotation positions of the swing arms, and a damping function is implemented through cooperation between the disposed first cams 181 and second cams 182. A damping force in a process of folding the mobile terminal can be increased, to provide an adjustable damping force or better folding operation experience.

Referring to FIG. 2 and FIG. 4 together, when the rotating shaft mechanism 10 supports the flexible display 40, the flexible display 40 is supported by using the support assembly, thereby improving an effect of supporting the flexible display 40. When the support assembly is specifically disposed, referring to FIG. 5, the support assembly includes two support plates, and the two support plates are correspondingly disposed on the two sides of the main shaft assembly 11. To be specific, the two support plates are disposed on the two sides of the main shaft assembly 11 in the length direction of the main shaft assembly 11. As shown in FIG. 4, when the main shaft assembly 11 has the first surface and the second surface opposite to the first surface, the first surface is a surface used to support the flexible display 40, and the support plate also has a surface used to support the flexible display 40. When the support plates rotate to a particular position, for example, a position shown in FIG. 2, the rotating shaft mechanism is unfolded and can support the flexible display. In this case, the first surface is approximately flush with the surface that is of the support plate and that is used to support the flexible display 40, so that the flexible display 40 can be evenly supported. Being approximately flush means that the first surface is flush with the surface that is of the support plate and that supports the flexible display 40, or there is a particular error between the first surface and the surface. The disposed first surface is flush with the surface that is of the support plate and that supports the flexible display 40, thereby improving an effect of supporting the flexible display 40.

When the two support plates are specifically disposed, for ease of description, the support plates are divided into a left support plate 12a and a right support plate 12b. The left support plate 12a is correspondingly connected to the left swing arm 13a and the left connecting rod 14a that are on a left side, and the right support plate 12b is connected to the corresponding right swing arm 13b and right connecting rod 14b. However, during specific connection, different disposing manners may be used, and the following separately describes the manners with reference to the accompanying drawings.

Figure 15:
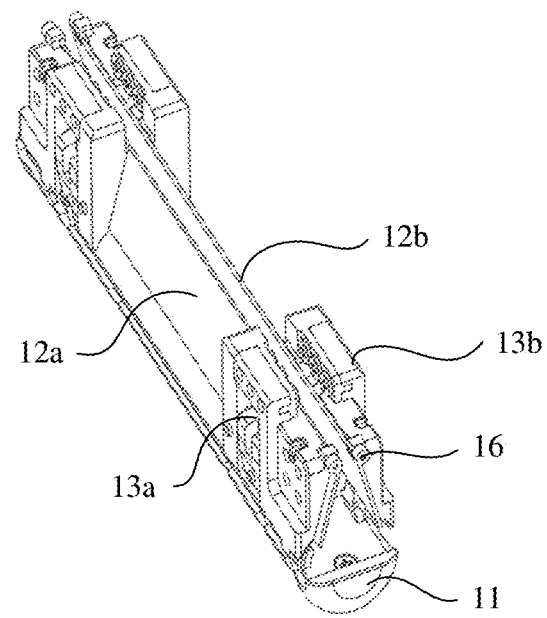
FIG. 15 is a schematic diagram of cooperation between a support assembly and a swing arm assembly according to an embodiment of this application.
Figure 16:
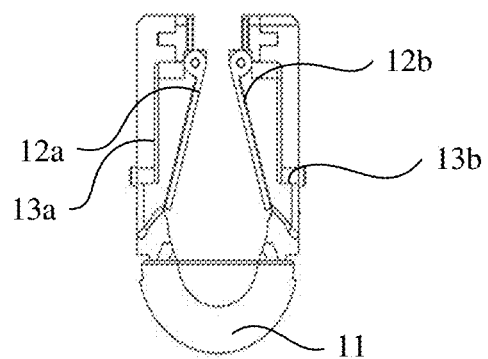
FIG. 16 is a schematic diagram of end faces of a support assembly and a swing arm assembly according to an embodiment of this application.
Figure 17A:
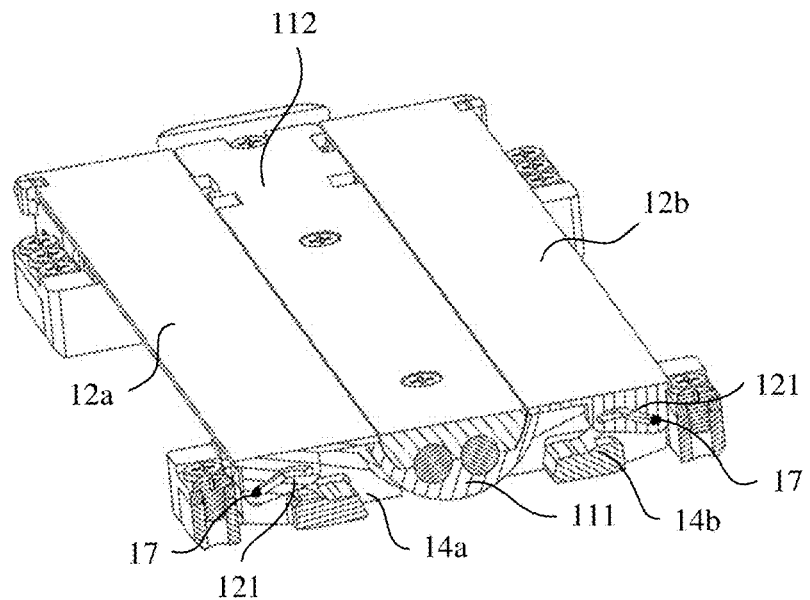
FIG. 17a and FIG. 17b are schematic diagrams of cooperation between a support plate and a swing arm during unfolding according to an embodiment of this application.

Referring to FIG. 15 and FIG. 16, FIG. 15 and FIG. 16 show a specific connection manner. In structures shown in FIG. 15 and FIG. 16, a connection manner of the left support plate 12a is the same as a connection manner of the right support plate 12b. Therefore, the left support plate 12a is used as an example for description. As shown in FIG. 15 and FIG. 16, the left support plate 12a is rotatably connected to the left swing arm 13a. During specific connection, the left support plate 12a is rotatably connected to the left swing arm 13a by using first pin shafts 16. Referring to FIG. 5 together, two ends on a left side of the left support plate 12a (a placement direction of the left support plate 12a in FIG. 5 is used as a reference direction) are respectively rotatably connected to the two left swing arms 13a by using the first pin shafts 16. In addition, the left support plate 12a is slidably connected to the left connecting rods 14a, and the left support plate 12a can rotate relative to the left connecting rods 14a. Referring to FIG. 17a together, FIG. 17a shows a specific manner of connection between the left support plate 12a and the left connecting rods 14a. A second sliding slot 121 is disposed on the left support plate 12a, a second protrusion is disposed on the corresponding left connecting rod 14a, and the second protrusion is slidably assembled in the second sliding slot 121. The second protrusion shown in FIG. 17a is a second pin shaft 17, and the second pin shaft 17 is slidably assembled in the second sliding slot 121. When the left support plate 12a and the left connecting rod 14a slide relative to each other, because the left connecting rod 14a and the left swing arm 13a may rotate relative to each other, the left support plate 12a is also driven to rotate relative to the left connecting rod 14a. For ease of understanding of a rotation manner of the left support plate 12a, the following describes the rotation manner with reference to the specific accompanying drawings.

Figure 17B:
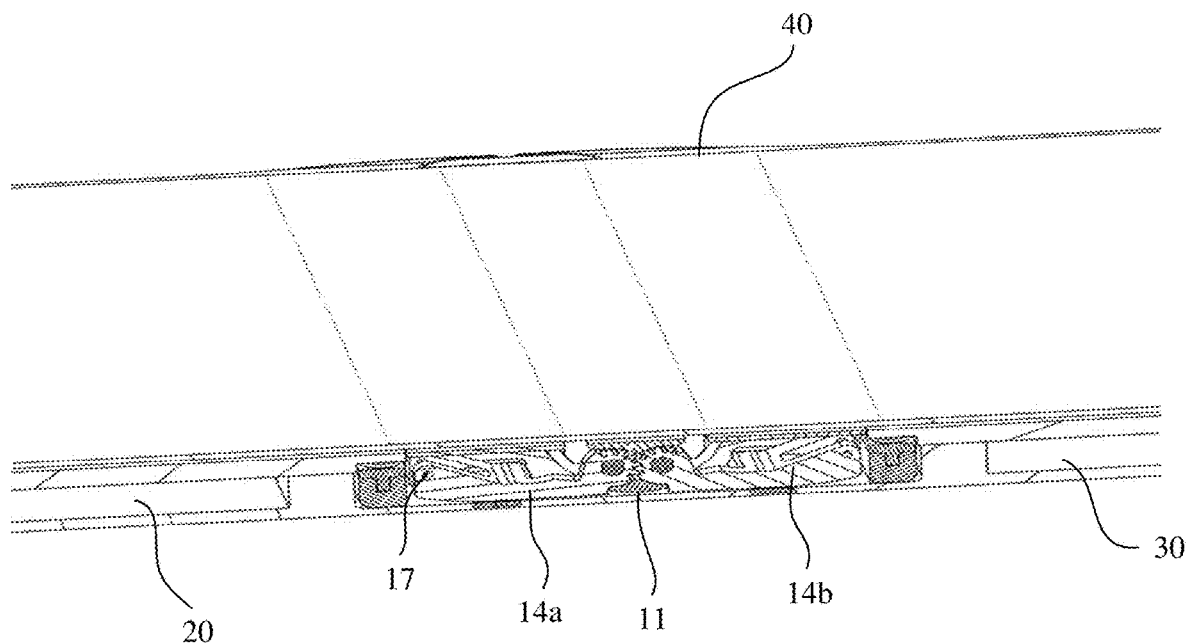
Figure 18:
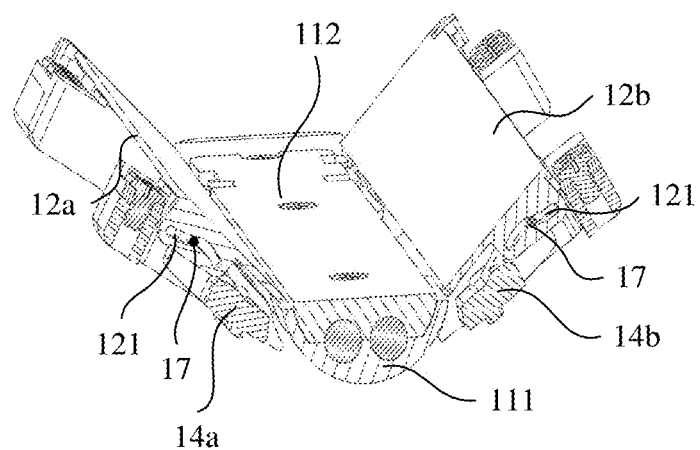
FIG. 18 is a schematic diagram of cooperation between a support plate and a swing arm during rotation according to an embodiment of this application.
Figure 19A:
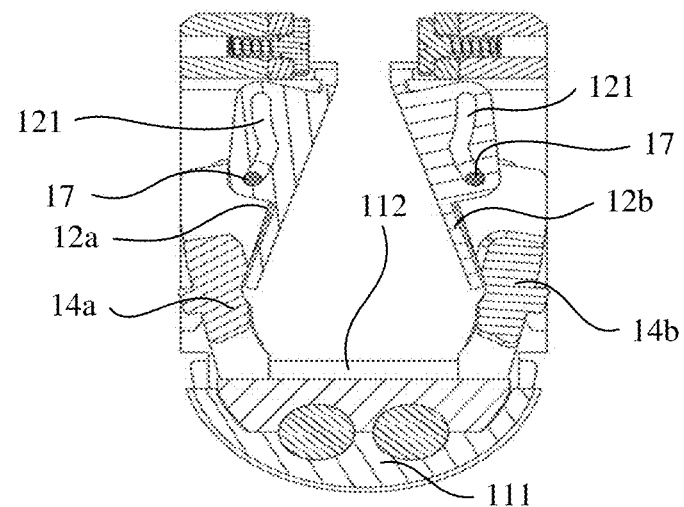
FIG. 19a and FIG. 19b are schematic diagrams of cooperation between a support plate and a swing arm during folding according to an embodiment of this application.
Figure 19B:
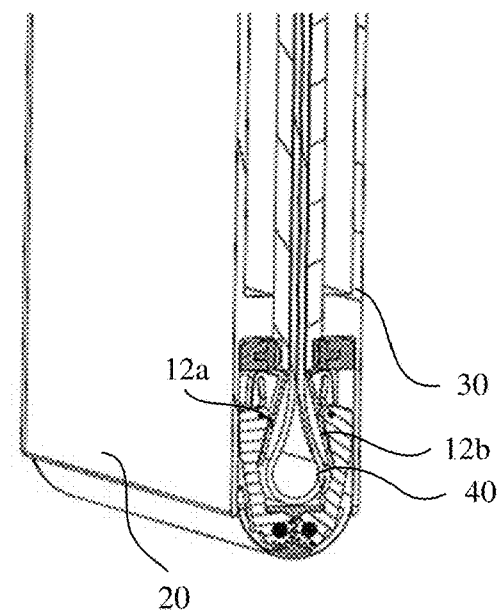

First, referring to FIG. 17a and FIG. 17b, FIG. 17a and FIG. 17b show states of the support plates, the swing arms, and the connecting rods of the rotating shaft mechanism when the mobile terminal is in the unfolded state. In the structure shown in FIG. 17a, the left support plate 12a is flush with the first surface, and the second pin shaft 17 on the left connecting rod 14a is located on a left side of the second sliding slot 121. In this case, as shown in FIG. 17b, the left housing 20, the rotating shaft mechanism 10, and the right housing 30 are sequentially unfolded, and the flexible display 40 covering the left housing 20, the rotating shaft mechanism 10, and the right housing 30 is unfolded. When the mobile terminal needs to be folded, as shown in FIG. 18, FIG. 18 shows a state when the rotating shaft mechanism 10 rotates to a particular angle. In this case, it can be learned that the left connecting rod 14a and the left swing arm 13a rotate relative to the main shaft assembly 11. In addition, because the left swing arm 13a and the left connecting rod 14a rotate around different axes, the left connecting rod 14a and the left swing arm 13a slide and rotate relative to each other. In addition, the second pin shaft 17 slides to a position in the middle of the second sliding slot 121, and the second pin shaft 17 drives the left support plate 12a to rotate towards the left swing arm 13a. When the left housing 20 and the right housing 30 are folded in place (that is, the mobile terminal is in the folded state), as shown in FIG. 19a and FIG. 19b, the second pin shaft 17 is located on a rightmost end of the second sliding slot 121, and when the left support plate 12a and the left swing arm 13a are driven by the second pin shaft 17, the left support plate 12a and the left swing arm 13a are close to each other or there is a relatively small gap between the left support plate 12a and the left swing arm 13a. In this case, the swing arms located on the two sides of the main shaft assembly 11 rotate to the first position in the directions towards each other, the corresponding connecting rods and the swing arms drive the two support plates to rotate to a second position in directions towards each other, and the support plates and the main shaft assembly enclose folding space for accommodating the flexible display of the mobile terminal. In an embodiment, as shown in FIG. 19a, the support plates and the main inner shaft 112 enclose space similar to a triangle. Referring to FIG. 19b together, when the flexible display 40 is folded, a folded area of the flexible display 40 forms a bend similar to a droplet shape.

When the right support plate 12b is disposed, a connection manner of the right support plate 12b is the same as the foregoing connection manner of the left support plate 12a. Therefore, details are not described herein again.

It can be learned from the foregoing description that the left connecting rod 14a and the right connecting rod 14b in the disposed connecting rod group drive the left support plate 12a and the right support plate 12b to move. Because the axis around which the connecting rod rotates is different from the axis around which the swing arm rotates, the first protrusions 141 are designed on the connecting rod, and the first sliding slots 131 are designed on the swing arm. When the rotating shaft mechanism 10 rotates for folding, the first sliding slots 131 on the swing arm and the first protrusions 141 on the connecting rod drive the connecting rod to rotate, and synchronization is implemented through engaging between the gears 142. In addition, in a folding process, a phase difference generated when the connecting rod and the swing arm rotate around different axes is used, and the second protrusion on the connecting rod drives the support plate to rotate, to evenly support the display in the unfolded state, and provide sufficient accommodation space for the display in the folded state.

Still referring to FIG. 19a and FIG. 19b, when the rotating shaft mechanism 10 is folded, the left swing arm 13a and the right swing arm 13b rotate relative to the main shaft assembly 11 when the rotating shaft mechanism 10 rotates. In addition, when the left swing arm 13a and the right swing arm 13b rotate, the left support plate 12a and the right support plate 12b are driven to rotate. After the rotating shaft mechanism is completely folded, the left support plate 12a and the right support plate 12b rotate relative to the left swing arm 13a and the right swing arm 13b to form concave space. The concave space not only can accommodate the display when the rotating shaft mechanism is completely folded, but also can ensure that a non-adhesive area of the flexible display 40 has sufficient space for concaveness without arching in the folding process. In addition, after the rotating shaft mechanism is completely folded, there is no large gap between the left housing 20 and the right housing 30 on the two sides, and the left housing 20 and the right housing 30 can be completely folded, to achieve equal thickness of a structural design in the folded state.

Figure 20:
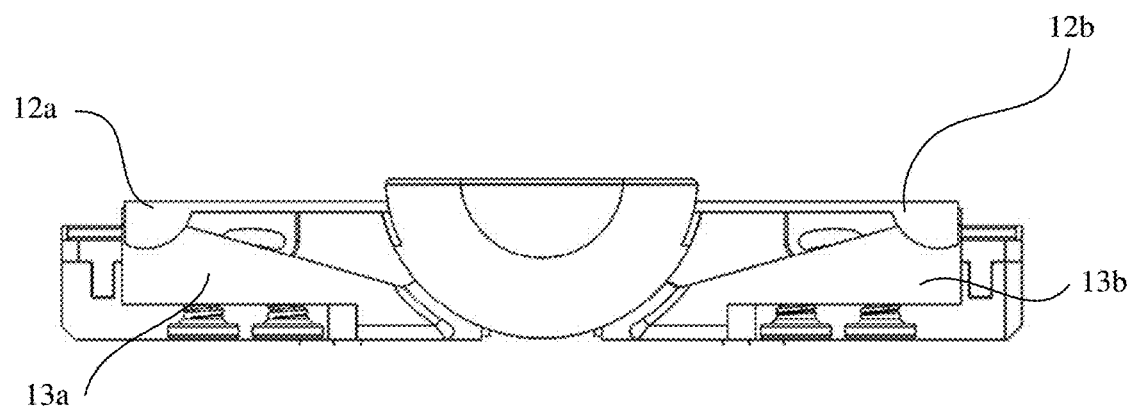
FIG. 20 is another schematic diagram of cooperation between a support plate and a swing arm according to an embodiment of this application.
Figure 21:
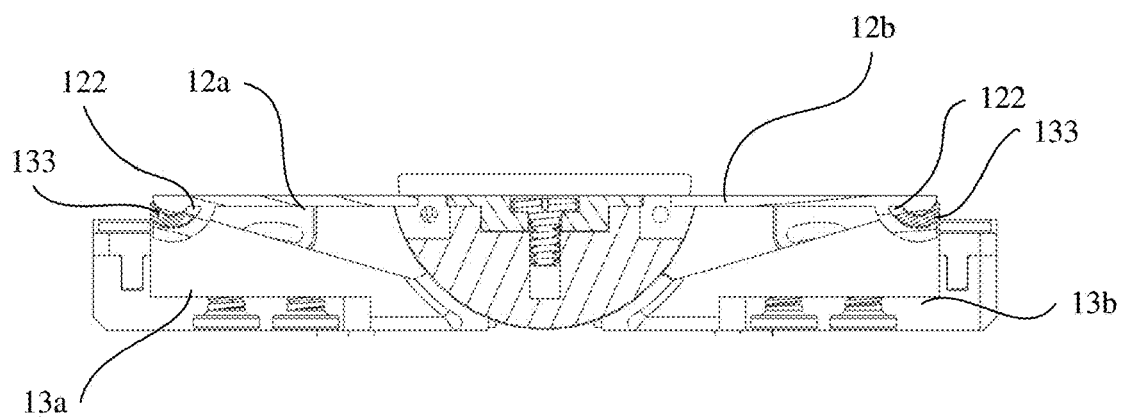
FIG. 21 is a schematic diagram of cooperation between a support plate and a swing arm during unfolding according to an embodiment of this application.
Figure 22:
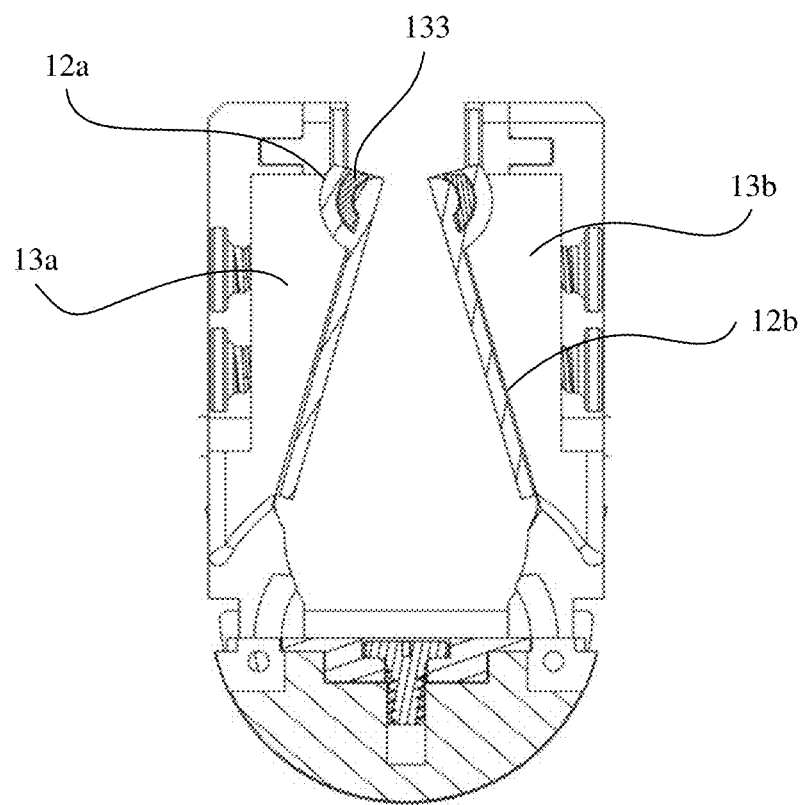
FIG. 22 is a schematic diagram of cooperation between a support plate and a swing arm during folding according to an embodiment of this application.

When the support plate is rotatably connected to the corresponding swing arm, in addition to that the foregoing first pin shafts 16 are used, another manner may be used. For example, a second arc-shaped sliding slot 122 is disposed on each support plate. A second arc-shaped arm 133 slidably assembled in the second arc-shaped sliding slot 122 is disposed on the swing arm corresponding to each support plate. The rotating shaft mechanism 10 shown in FIG. 20, FIG. 21, and FIG. 22 is used as an example. When the left support plate 12a and the left swing arm 13a are specifically disposed, the second arc-shaped sliding slot 122 is disposed on the left support plate 12a, and correspondingly, the second arc-shaped arm 133 slidably assembled in the second arc-shaped sliding slot 122 is disposed on the left swing arm 13a, and an assembly relationship thereof is similar to rotatable connection between the left swing arm 13a and the main shaft assembly 11. When the left support plate 12a rotates relative to the left swing arm 13a, as shown in FIG. 21 and FIG. 22, when the left support plate 12a rotates to different positions, limiting is performed based on a sliding position of the second arc-shaped arm 133 in the second arc-shaped sliding slot 122. For a specific cooperation relationship, refer to the foregoing cooperation relationship between the left swing arm 13a and the main shaft assembly 11. In addition, cooperation between the right support plate 12b and the right swing arm 13b is similar, and details are not described herein again.

Figure 23:
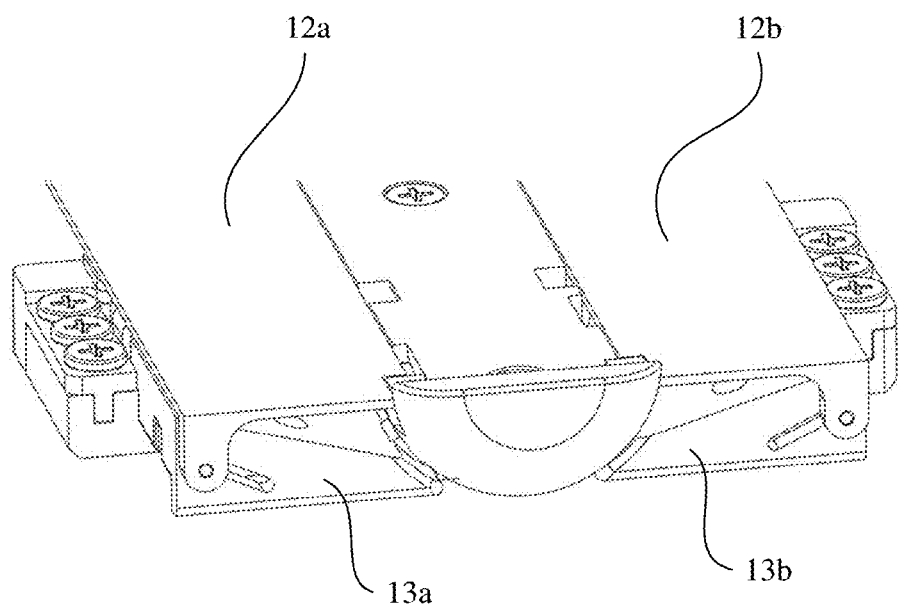
FIG. 23 is another schematic diagram of cooperation between a support plate and a swing arm according to an embodiment of this application.
Figure 24:
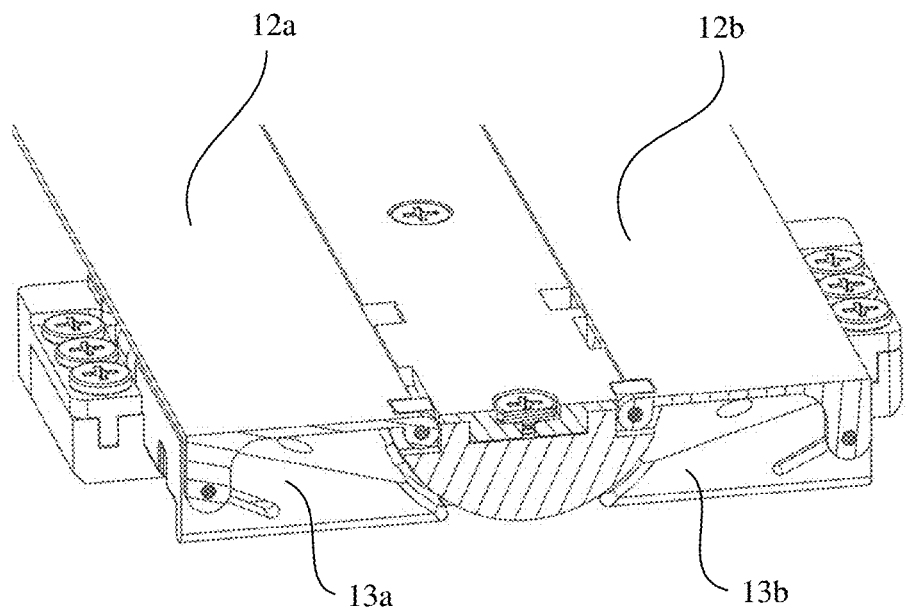
FIG. 24 is a schematic diagram of cooperation between a support plate and a swing arm during unfolding according to an embodiment of this application.
Figure 25:
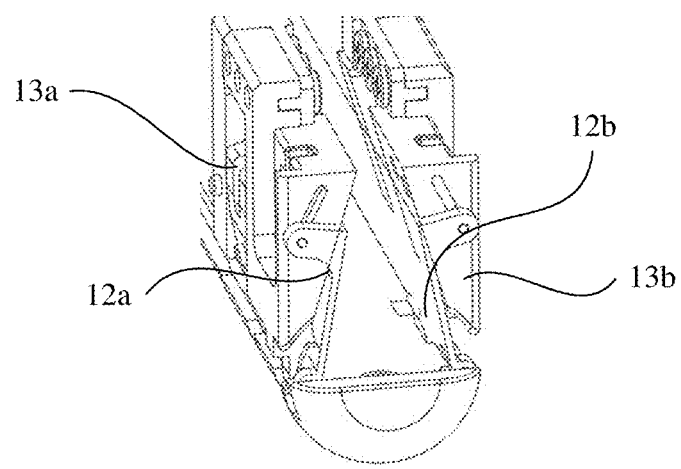
FIG. 25 is a schematic diagram of cooperation between a support plate and a swing arm during folding according to an embodiment of this application.

In an embodiment, an embodiment of this application further provides another support plate disposing manner. The left support plate 12a is still used as an example. When the left support plate 12a is specifically disposed, as shown in FIG. 23 and FIG. 24, the left support plate 12a is rotatably connected to the main shaft assembly 11, and the left support plate 12a is slidably connected to the left swing arm 13a. As shown in FIG. 24, a right side (a placement direction of the support plate in FIG. 24 is used as a reference direction) of the left support plate 12a is rotatably connected to the main shaft assembly 11 by using a pin shaft, and a left side is also slidably connected to the left swing arm 13a by using a pin shaft. In addition, a corresponding sliding slot is correspondingly slidably assembled on the left swing arm 13a. When the mobile terminal is folded, as shown in FIG. 25, the left support plate 12a rotates relative to the main shaft assembly 11. In addition, because there is a relative sliding and rotation relationship between the left swing arm 13a and the main shaft assembly 11, the pin shaft disposed on the left swing arm 13a drives the left support plate 12a to rotate. A connection manner of the right support plate 12b is the same as the connection manner of the left support plate 12a. Therefore, details are not described herein again. In this case, when the swing arms located on the two sides of the main shaft assembly 11 rotate to the first position in the directions towards each other, the corresponding swing arms drive the two support plates to rotate to the second position in the directions towards each other, so that the support plates and the main shaft assembly 11 enclose folding space for accommodating the flexible display of the mobile terminal.

It can be learned from the foregoing description that when each support plate is specifically disposed, the support plate may be rotatably connected to the swing arm located on a same side and may be slidably connected to the connecting rod located on the same side, or the support plate may be rotatably connected to the main shaft assembly 11 and may be slidably connected to the swing arm located on a same side, so that the rotating shaft mechanism 10 forms a support form of three door panels (the left support plate 12a, the main inner shaft 112, and the right support plate 12b), to match support solutions in different scenarios, ensure that the display is evenly and properly supported, and provide sufficient accommodation space for the folded display. In addition, when the flexible display 40 is accommodated, the folded mobile terminal may be of equal thickness, to avoid a bulge caused by folding.

When the main shaft assembly is specifically disposed, as shown in FIG. 5, notches (not marked in the figure) are disposed on the main outer shaft 111, so that the connecting rods can be exposed outside the main shaft assembly 11 and are connected to the swing arms. When the mobile terminal is in the folded state, the notches are exposed and affect an appearance of the mobile terminal. Therefore, the rotating shaft mechanism 10 provided in this embodiment of this application further provides a flexible blocking layer 15. The flexible blocking layer 15 may be made of an elastic material, for example, an elastic steel plate or an elastic plastic plate. When the mobile terminal is folded, the flexible blocking layer 15 can rotate with the rotating shaft mechanism 10.

Figure 26:
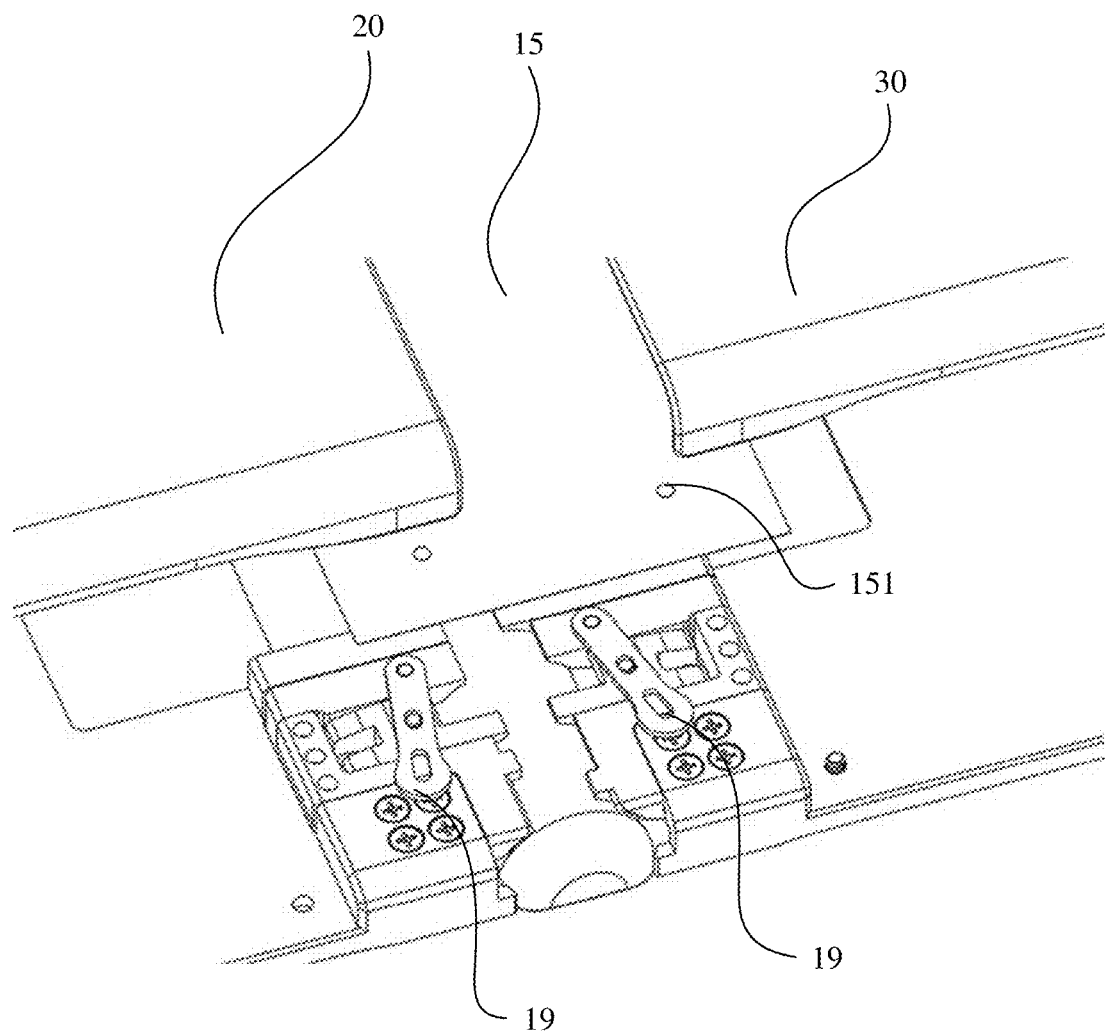
FIG. 26 is a schematic exploded diagram of a flexible blocking layer and a swing arm according to an embodiment of this application.

When the flexible blocking layer 15 is specifically disposed, different connection manners may be used. In a connection manner, the flexible blocking layer 15 is fixedly connected to a surface that is of the main shaft assembly 11 and that faces away from the surface supporting the flexible display 40, that is, the flexible blocking layer 15 is fixed to the second surface of the main outer shaft 111. In addition, during specific connection, the flexible blocking layer 15 may not be connected to the main outer shaft 111, or may be connected to the main outer shaft 111 in the following manner: adhesive connection, riveting, welding, or the like. Two ends of the flexible blocking layer 15 are respectively suspended on two sides of the main outer shaft 111. In addition, as shown in FIG. 26, when the rotating shaft mechanism 10 is fixedly connected to the left housing 20 and the right housing 30, the two ends of the flexible blocking layer 15 may be inserted into and press against the left housing 20 and the right housing 30. In this case, when the mobile terminal is observed from a side that is of the mobile terminal and that faces away from the flexible display 40, the disposed flexible blocking layer 15 can block the notches. During bending, the two ends of the flexible blocking layer 15 press against the left housing 20 and the right housing 30, so that the flexible blocking layer 15 is driven to be elastically deformed and rotate along with the rotating shaft mechanism 10.

Figure 27:
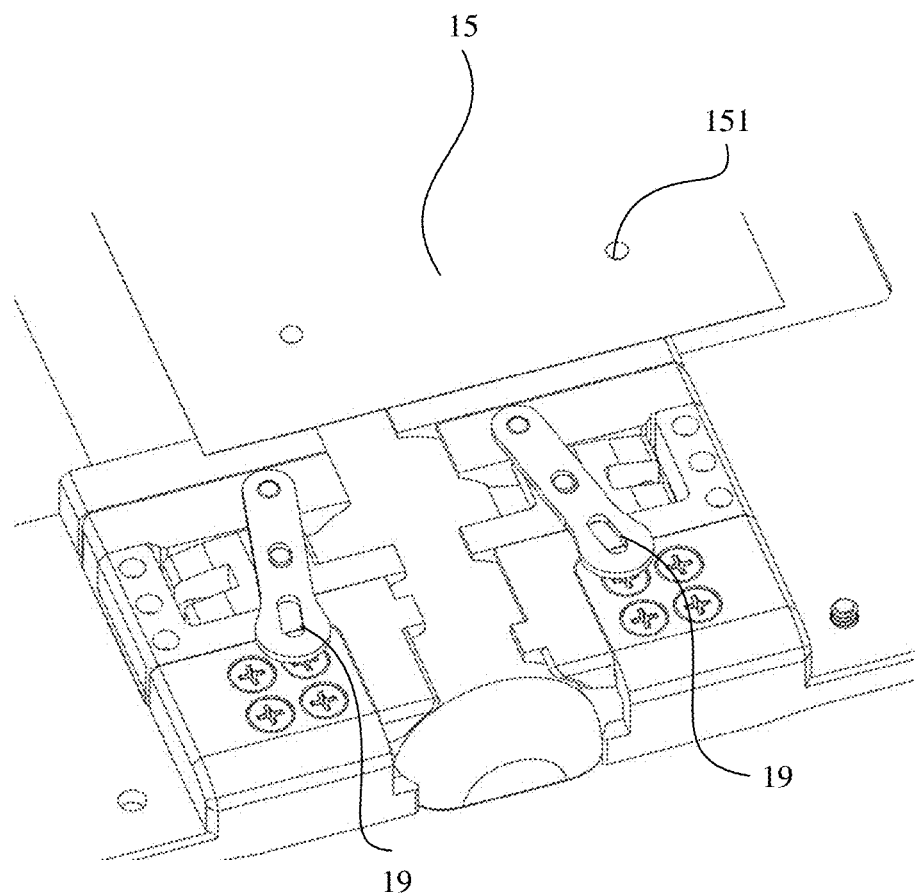
FIG. 27 is a schematic diagram of cooperation between a flexible blocking layer and a swing arm according to an embodiment of this application.

In an embodiment, the flexible blocking layer 15 may be alternatively disposed in another manner. For example, the flexible blocking layer 15 is fixedly connected to the surface that is of the main shaft assembly 11 and that faces away from the surface supporting the flexible display 40, that is, the flexible blocking layer 15 is fixed to the second surface of the main outer shaft 111. In addition, during specific connection, the fixed connection may be implemented in an adhesive connection manner or another connection manner. In addition, in the disposed swing arm group, at least one swing arm is rotatably connected to a swing rod 19, and the swing rod 19 is slidably connected to the flexible blocking layer 15. Referring to FIG. 26 and FIG. 27 together, FIG. 26 and FIG. 27 show a case in which swing rods 19 are disposed in a swing arm group. When the left swing arm 13a and the right swing arm 13b are specifically disposed, each of the left swing arm 13a and the right swing arm 13b is rotatably connected to the swing rod 19, and the swing rods 19 are slidably connected to the flexible blocking layer 15. During specific disposing, a pin shaft 151 corresponding to each swing rod 19 is disposed on the flexible blocking layer 15, and the pin shaft 151 is clamped onto a sliding slot disposed on the swing rod 19, and can limit movement of the flexible blocking layer 15 in a direction perpendicular to a surface that is of the flexible blocking layer 15 and that faces the main shaft assembly 11. When the left swing arm 13a and the right swing arm 13b rotate, relative displacements of the left swing arm 13a and the right swing arm 13b and the flexible blocking layer 15 during rotation are offset by rotation of the swing rods 19 and sliding of the pin shafts 151 in the sliding slots. It should be understood that the foregoing shows a case in which the swing rod 19 is disposed on each of the left swing arm 13a and the right swing arm 13b. However, in this embodiment of this application, the swing rod 19 may be disposed on only one of the swing arms, or the swing rods may be disposed on a plurality of swing arms.

In addition, FIG. 26 and FIG. 27 show a case in which the swing rod 19 is disposed on each of the left swing arm 13a and the right swing arm 13b. However, in the rotating shaft mechanism 10 provided in this embodiment of this application, the swing rods 19 may be alternatively disposed on the left connecting rod 14a and the right connecting rod 14b. The principle of the swing rods 19 is similar, and only positions of the swing rods 19 are changed. Therefore, details are not described herein again.

It can be learned from the foregoing description that in a process of folding the structural design, the flexible blocking layer 15 may always match an outline of the main outer shaft 111 of the rotating shaft, to play a role of appearance shielding at any moment in the folding process. The flexible blocking layer 15 may be fixed to the outside of the main outer shaft 111 by using a process such as adhesive connection, riveting, or welding.

Figure 28:
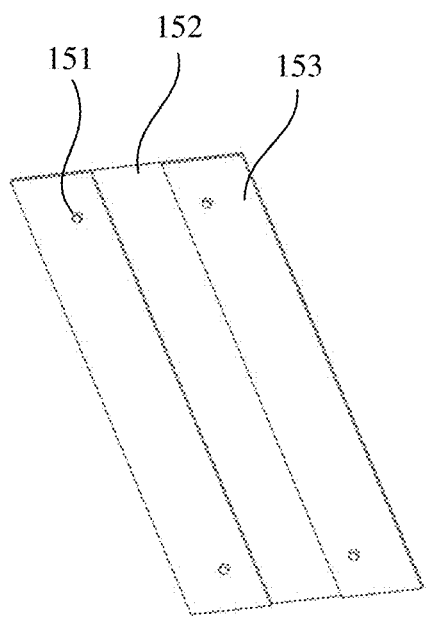
FIG. 28 is a schematic structural diagram of another flexible blocking layer according to an embodiment of this application.

As shown in FIG. 28, the flexible blocking layer 15 may be designed as an assembly.

A middle area 152 of the flexible blocking layer 15 is a bendable area formed by a flexible structural piece, and areas 153 on two sides are non-bending areas formed by rigid structural pieces. In this case, the flexible blocking layer 15 includes the rigid structural pieces located on the two sides, the flexible structural piece, and four pin shafts 153. The rigid structural pieces and the flexible structural piece may be connected in an adhesive connection manner or a welding manner, and the pin shafts 153 and the rigid structural pieces are connected by using a process such as riveting or welding. The pin shafts 153 may be slidably connected to the sliding slots on the swing rods 19.

In addition, an embodiment of this application further provides a mobile terminal. The mobile terminal includes the rotating shaft mechanism 10 described above, two housings, and a flexible display 40 fixedly connected to the two housings. The two housings are arranged on two sides of the main shaft assembly 11, and each housing is fixedly connected to a swing arm located on a same side. As shown in FIG. 1 and FIG. 2, the mobile terminal includes a left housing 20 and a right housing 30. The left housing 20 and the right housing 30 are fixedly connected to a left swing arm 13a and a right swing arm 13b in the rotating shaft mechanism 10, respectively. In addition, the flexible display 40 is divided into five areas, which are respectively an A1 area, a B1 area, a C area, a B2 area, and an A2 area divided by dashed lines in FIG. 1. The A1 area and the A2 area are fixedly connected to the left housing 20 and the right housing 30, respectively, and are attached to upper surfaces of the two housings by using adhesive during specific fixed connection. In addition, the B1 area and the B2 area correspond to areas of a left support plate 12a and a right support plate 12b, and the C1 area corresponds to an area of a first surface of a main outer shaft 111. There are two specific adhesive connection manners in which the B1 area, the B2 area, and the C1 area are specifically connected to a first surface of the rotating shaft mechanism 10, the left support plate 12a, and the right support plate 12b. Sectional views of the mobile terminal in a folded state in the two adhesive connection manners are respectively FIG. 29 and FIG. 30, and are separately described below.

Figure 29:
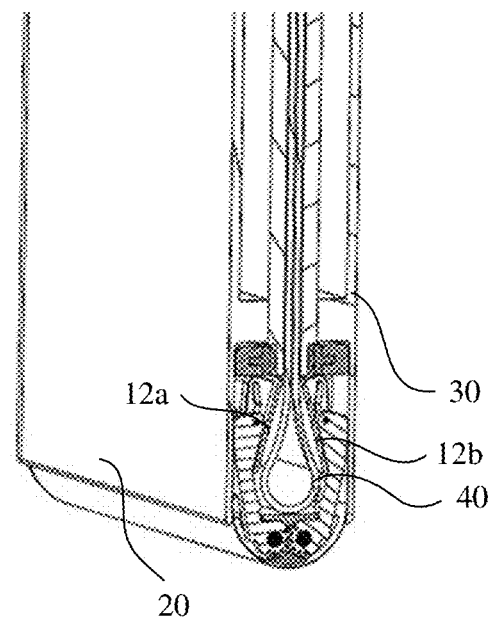
FIG. 29 is a schematic diagram of cooperation between a flexible display and a rotating shaft mechanism according to an embodiment of this application.

In a first adhesive connection manner, the A1 area is connected to the left housing 20 by using adhesive, the A2 area is connected to the right housing 30, and the B1 area, the B2 area, and the C area are not coated with adhesive and are non-adhesive areas of the flexible display 40. The display in the folded state is shown in FIG. 29. The non-adhesive areas of the flexible display 40 are of a droplet shape.

Figure 30:
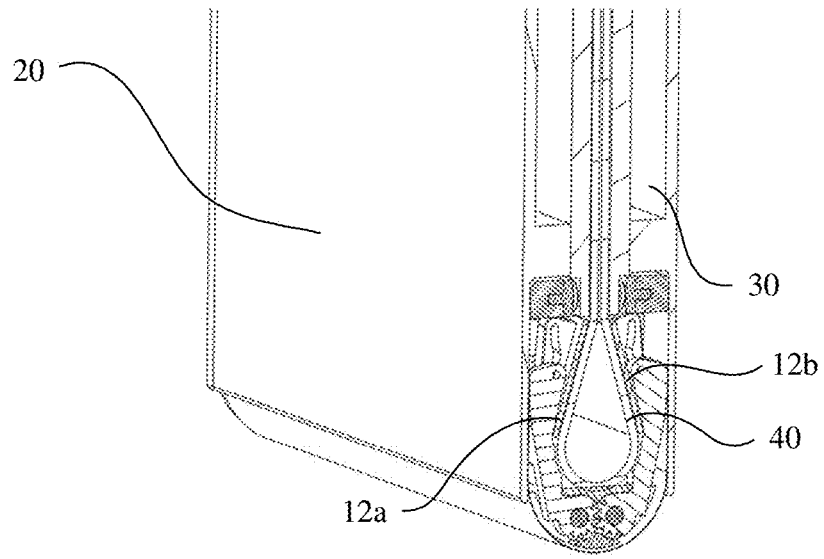
FIG. 30 is another schematic diagram of cooperation between a flexible display and a rotating shaft mechanism according to an embodiment of this application.

In a second adhesive connection manner, the A1 area of the display is connected to the left housing 20 by using adhesive, the A2 area of the display is connected to the right housing 30, the B1 area is connected to the left support plate 12a of the rotating shaft mechanism 10 by using adhesive, the B2 area is connected to the right support plate 12b of the rotating shaft mechanism 10 by using adhesive, and the C area is not coated with adhesive and is a non-adhesive area of the display. The display in the folded state is shown in FIG. 30, and the non-adhesive area of the display is of a semi-arc shape.

During use, when the rotating shaft mechanism is unfolded, the main shaft assembly 11 and the support plates are configured to support the flexible display 40 of the mobile terminal. When the support plates rotate to a second position, because there is relative sliding between the swing arms and the main shaft assembly 11, when the support plates rotate to the second position, the main shaft assembly 11 and the support plates enclose space for accommodating a folded part of the flexible display 40. In addition, connecting rods rotate, and the swing arms slide and rotate relative to the rotating shaft, so that thickness of a folded folding mechanism is approximately equal to thickness of the two stacked housings, thereby improving an effect of the folded mobile terminal. In addition, the support plates and the main shaft assembly 11 enclose the space for accommodating the flexible display 40, thereby improving a bending effect of the flexible display 40.

It can be learned from the foregoing description that no relative sliding is generated between the display of the mobile terminal and the left housing and the right housing 30, and the rotating shaft in the folded state provides sufficient concave space for the display, so that the non-adhesive area of the flexible display 40 is hidden in the concave space in the droplet shape or the semi-arc shape. The structural design in the folded state is of equal thickness, and there is no large gap between the housings on the two sides.

In addition, when a flexible blocking layer 15 is used for blocking, the flexible blocking layer 15 is inserted into the two housings and presses against the two housings. For details, refer to the descriptions in FIG. 26 and FIG. 27. A folding effect of the mobile terminal is improved by using the disposed flexible blocking layer 15.

The foregoing descriptions are merely the embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotating shaft mechanism of a foldable mobile terminal, the rotating shaft mechanism comprising:
    a main shaft assembly;
    a swing arm assembly, comprising at least one connecting rod group and at least one swing arm group, wherein each connecting rod group comprises two connecting rods that are respectively disposed on two sides of the main shaft assembly and that are rotatably connected to the main shaft assembly; each swing arm group comprises two swing arms respectively disposed on the two sides of the main shaft assembly, and each swing arm is rotatably connected to the main shaft assembly; an axis around which each swing arm rotates and an axis around which a connecting rod located on a same side of the main shaft assembly rotates are different axes, and each are parallel to a length direction of the main shaft assembly; and each swing arm is slidably connected to and can rotate relative to at least one connecting rod located on a same side of the main shaft assembly; and
    a support assembly, comprising two support plates respectively disposed on the two sides of the main shaft assembly, wherein each support plate is rotatably connected to a swing arm located on a same side of the main shaft assembly, is slidably connected to and can rotate relative to a connecting rod located on the same side of the main shaft assembly; or each support plate is rotatably connected to the main shaft assembly, and is slidably connected to and can rotate relative to a swing arm located on a same side of the main shaft assembly, wherein an axis around which each support plate is rotatably connected to a swing arm located on a same side of the main shaft assembly or rotatably connected to the main shaft assembly is parallel to the length direction of the main shaft assembly, wherein
    when the two swing arms located on the two sides of the main shaft assembly rotate to a first position in directions towards each other, the two connecting rods or the two swing arms drive the two support plates to rotate to a second position in directions towards each other, and the two support plates and the main shaft assembly enclose folding space for accommodating a flexible display of the foldable mobile terminal.

2. The rotating shaft mechanism according to claim 1, wherein axes around which the two connecting rods in each connecting rod group rotate are symmetrically disposed on two sides of axes around which two swing arms in each swing arm group rotate.

3. The rotating shaft mechanism according to claim 1, wherein a sliding direction of each connecting rod is perpendicular to an axial direction of the connecting rod, and when the two swing arms located on the two sides of the main shaft assembly rotate to the first position in the directions towards each other, each connecting rod slide to a position close to an axis around which a swing arm located on a same side of the main shaft assembly rotates.

4. The rotating shaft mechanism according to claim 1, wherein a first arc-shaped sliding slot in a one-to-one correspondence with each swing arm is disposed on the main shaft assembly, and a first arc-shaped arm slidably assembled in the corresponding first arc-shaped sliding slot is disposed on each swing arm.

5. The rotating shaft mechanism according to claim 4, wherein two first arc-shaped arms disposed on the two swing arms in each swing arm group are disposed in a staggered manner.

6. The rotating shaft mechanism according to claim 1, wherein two gears are respectively disposed on two opposite ends of the two connecting rods in each connecting rod group, and the two gears engage with each other.

7. The rotating shaft mechanism according to claim 6, wherein a cavity for accommodating the two engaging gears is disposed in the main shaft assembly.

8. The rotating shaft mechanism according to claim 1, further comprising: a limiting mechanism, configured to limit relative positions at which the two connecting rods rotate relative to the main shaft assembly.

9. The rotating shaft mechanism according to claim 8, wherein the limiting mechanism comprises a first cam that rotates synchronously with each connecting rod, and a second cam that is disposed opposite to the first cam, wherein protrusions and notches that engage with each other are respectively disposed on opposite surfaces of the first cam and the second cam that are disposed opposite to each other, and one of the first cam and the second cam can slide relative to the main shaft assembly; and the limiting mechanism further comprises: an elastic part configured to push the first cam or the second cam to slide towards each other.

10. The rotating shaft mechanism according to claim 9, wherein the limiting mechanism further comprises a camshaft fixedly connected to each connecting rod, the camshaft penetrates the first cam and the second cam that are disposed opposite to each other, the first cam can rotate synchronously with the camshaft, and the second cam can rotate relative to the camshaft.

11. The rotating shaft mechanism according to claim 1, wherein a notch in a one-to-one correspondence with the connecting rod located on a same side of the main shaft assembly is disposed on each swing arm, and the connecting rod located on a same side of the main shaft assembly is at least partially located in the corresponding notch.

12. The rotating shaft mechanism according to claim 11, wherein two first sliding slots are disposed on two sides of the notch on each swing arm, and two first protrusions slidably assembled in the two first sliding slots are disposed on each connecting rod.

13. The rotating shaft mechanism according to claim 1, wherein a second sliding slot is disposed on each support plate, and a second protrusion slidably assembled in the second sliding slot is disposed on each connecting rod or each swing arm.

14. The rotating shaft mechanism according to claim 1, wherein each support plate is rotatably connected to the swing arm located on a same side of the main shaft assembly by using first pin shafts; or
a second arc-shaped sliding slot is disposed on each support plate, and a second arc-shaped arm slidably assembled in the second arc-shaped sliding slot is disposed on each swing arm.

15. A foldable mobile terminal, comprising:
a rotating shaft mechanism;
two housings; and
a flexible display fixedly connected to the two housings, wherein the rotating shaft mechanism comprises:
a main shaft assembly;
a swing arm assembly, comprising at least one connecting rod group and at least one swing arm group, wherein each connecting rod group comprises two connecting rods that are respectively disposed on two sides of the main shaft assembly and that are rotatably connected to the main shaft assembly; each swing arm group comprises two swing arms respectively disposed on the two sides of the main shaft assembly, and each swing arm is rotatably connected to the main shaft assembly; an axis around which each swing arm rotates and an axis around which a connecting rod located on a same side of the main shaft assembly rotates are different axes, and each are parallel to a length direction of the main shaft assembly; and each swing arm is slidably connected to and can rotate relative to at least one connecting rod located on a same side of the main shaft assembly; and
a support assembly, comprising two support plates respectively disposed on the two sides of the main shaft assembly, wherein each support plate is rotatably connected to a swing arm located on a same side of the main shaft assembly, is slidably connected to and can rotate relative to a connecting rod located on the same side of the main shaft assembly; or each support plate is rotatably connected to the main shaft assembly, and is slidably connected to and can rotate relative to a swing arm located on a same side of the main shaft assembly, wherein an axis around which each support plate is rotatably connected to a swing arm located on a same side of the main shaft assembly or rotatably connected to the main shaft assembly is parallel to the length direction of the main shaft assembly, wherein when the two swing arms located on the two sides of the main shaft assembly rotate to a first position in directions towards each other, the two connecting rods or the two swing arms drive the two support plates to rotate to a second position in directions towards each other, and the two support plates and the main shaft assembly enclose folding space for accommodating a flexible display of the foldable mobile terminal;
wherein the two housings are arranged on two sides of the main shaft assembly, and each housing is fixedly connected to the swing arm located on a same side.

16. The foldable mobile terminal according to claim 15, wherein the flexible display is connected to the two support plates by using adhesive.

17. The foldable mobile terminal according to claim 15, wherein the main shaft assembly has a first surface and a second surface opposite to the first surface, wherein the first surface is a surface used to support the flexible display, and when the rotating shaft mechanism is unfolded to support the flexible display, the first surface is flush with a surface that is of the two support plate and that is used to support the flexible display.

18. The foldable mobile terminal according to claim 15, further comprising: a flexible blocking layer, wherein the flexible blocking layer is fixedly connected to the surface that is of the main shaft assembly and that faces away from the surface supporting the flexible display, and two ends of the flexible blocking layer are suspended, and are used to be inserted into two housings of the foldable mobile terminal.

19. The foldable mobile terminal according to claim 15, further comprising: a flexible blocking layer, wherein the flexible blocking layer is fixedly connected to the surface that is of the main shaft assembly and that faces away from the surface supporting the flexible display; and
at least one swing arm is rotatably connected to a swing rod, and each swing rod is slidably connected to the flexible blocking layer.

20. The foldable mobile terminal according to claim 15, wherein axes around which the two connecting rods in each connecting rod group rotate are symmetrically disposed on two sides of axes around which two swing arms in each swing arm group rotate.

21. The foldable mobile terminal according to claim 15, wherein a sliding direction of each connecting rod is perpendicular to an axial direction of the connecting rod, and when the two swing arms located on the two sides of the main shaft assembly rotate to the first position in the directions towards each other, each connecting rod slide to a position close to an axis around which a swing arm located on a same side of the main shaft assembly rotates.

22. The foldable mobile terminal according to claim 15, wherein a first arc-shaped sliding slot in a one-to-one correspondence with each swing arm is disposed on the main shaft assembly, and a first arc-shaped arm slidably assembled in the corresponding first arc-shaped sliding slot is disposed on each swing arm.

23. The rotating shaft mechanism according to claim 15, wherein a notch in a one-to-one correspondence with the connecting rod located on a same side of the main shaft assembly is disposed on each swing arm, and the connecting rod located on a same side of the main shaft assembly is at least partially located in the corresponding notch.

24. The rotating shaft mechanism according to claim 15, wherein a second sliding slot is disposed on each support plate, and a second protrusion slidably assembled in the second sliding slot is disposed on each connecting rod or each swing arm.

25. The rotating shaft mechanism according to claim 15, wherein each support plate is rotatably connected to the swing arm located on a same side of the main shaft assembly by using first pin shafts; or
- a second arc-shaped sliding slot is disposed on each support plate, and a second arc-shaped arm slidably assembled in the second arc-shaped sliding slot is disposed on each swing arm.

\* \* \* \* \*